United States Patent
Perlman et al.

(10) Patent No.: US 7,767,949 B2
(45) Date of Patent: Aug. 3, 2010

(54) APPARATUS AND METHOD FOR CAPTURING STILL IMAGES AND VIDEO USING CODED APERTURE TECHNIQUES

(75) Inventors: Stephen G. Perlman, Palo Alto, CA (US); Axel Busboom, Unterleinleiter (DE); Tim S. Cotter, Sunnyvale, CA (US); John Speck, Sunnyvale, CA (US); Roger van der Laan, Los Altos, CA (US)

(73) Assignee: Rearden, LLC, San Francisco, CA (US)

( * ) Notice: Subject to any disclaimer, the term of this patent is extended or adjusted under 35 U.S.C. 154(b) by 0 days.

(21) Appl. No.: 11/039,029

(22) Filed: Jan. 18, 2005

(65) Prior Publication Data

US 2006/0157640 A1 Jul. 20, 2006

(51) Int. Cl.
*H01L 27/00* (2006.01)
*H01J 3/14* (2006.01)
*G01T 1/161* (2006.01)
*H04N 7/14* (2006.01)

(52) U.S. Cl. .............. 250/208.1; 250/216; 250/363.06; 348/14.07

(58) Field of Classification Search .............. 250/208.1, 250/363.06, 216; 348/14.07, 14.16
See application file for complete search history.

(56) References Cited

U.S. PATENT DOCUMENTS

| | | | |
|---|---|---|---|
| 4,209,780 A | 6/1980 | Fenimore et al. | |
| 4,855,061 A | 8/1989 | Martin | |
| 5,424,533 A | 6/1995 | Schmutz | |
| 5,479,026 A | 12/1995 | Schumtz et al. | |
| 5,756,026 A * | 5/1998 | Sanchez et al. | 264/138 |
| 6,141,104 A * | 10/2000 | Schulz et al. | 356/616 |
| 6,205,195 B1 | 3/2001 | Lanza | |
| 6,454,414 B1 * | 9/2002 | Ting | 353/28 |
| 6,643,386 B1 | 11/2003 | Foster | |
| 6,710,797 B1 * | 3/2004 | McNelley et al. | 348/14.16 |
| 6,737,652 B2 * | 5/2004 | Lanza et al. | 250/363.06 |
| 2003/0193599 A1 | 10/2003 | Campbell et al. | |
| 2005/0119868 A1 | 6/2005 | Scheidemann et al. | |

OTHER PUBLICATIONS

Pinhole Photography, Second Edition, by Eric Renner, 2000, ISBN: 0-240-80350-2.
S.R. Gottesman and E.E. Fenimore: "New Family of Binary Arrays for Coded Aperture Imaging", Applied Optics, 28:4344-4352, vol. 28, No. 20, Oct. 15, 1989.
B. Hendriks & Stein Kuiper: Through A Lens Sharply. IEEE Spectrum, Dec. 2004, pp. 32-36.
R.H. Dicke: Scatter-Hole Cameras for X-Rays and Gamma Rays. Astrohys. J., 153:L101-L016, 1968.
J. Gunson and B. Polycronopulos: Optimum Design of a Coded Mask X-Ray Telescope for Rocket Applications. Mon. Not. R. Astron. SOC., 177:485-497, 1976.
Paul Carlisle, "Coded Aperture Imaging" pp. 1-6, printed on Mar. 15, 2007, http://paulcarlise.net/old/codedapertur.html.

(Continued)

*Primary Examiner*—Thanh X Luu
(74) *Attorney, Agent, or Firm*—Blakely Sokoloff Taylor & Zafman LLP

(57) ABSTRACT

A system is described for capturing images comprising: a display for displaying graphical images and text; a plurality of apertures formed in the display; an image detector array configured behind the display and configured to sense light transmitted through the apertures in the display, the light reflected from a subject positioned in front of the display; and image processing logic to generate image data using the light transmitted through the apertures, the image data representing an image of a subject.

32 Claims, 21 Drawing Sheets

OTHER PUBLICATIONS

Fenimore, E.E., et al., "X-Ray Imaging Using Uniformly Redundant Arrays", LASL 78 102, Jan. 1979, pp. 4.

Fenimore, E.E., et al., "Uniformly Redundant Arrays", Digital Signal Processing Symposium, Dec. 6-7, 1977, pp. 14.

Fenimore, E.E., et al., "Coded Aperture Imaging With Uniformly Redundant Arrays" Feb. 1, 1978, vol. 17, No. 3, Applied Optics, pp. 337-347.

Fenimore, E.E., et al., "Coded Aperture Imaging: Predicted Performance of Uniformly Redundant Arrays", Applied Optics/ vol. 17, No. 22, Nov. 15, 1978, pp. 3562-3570.

Fenimore, E.E., et al., "Tomographical imaging using uniformly redundant arrays", Applied Optics, vol. 18, No. 7, pp. 1052-1057, Apr. 1, 1979.

Fenimore, E.E., et al., "Uniformly redundant array imaging of laser driven compressions: preliminary results", Applied Optics, Apr. 1, 1979, vol. 18, No. 7, pp. 945-947.

Fenimore, E.E., et al., Coded aperture imaging: the modulation transfer function for uniformly redundant arrays, Applied Optics, vol. 19, No. 14, Jul. 15, 1980, pp. 2465-2471.

Fenimore, E.E., et al., "Uniformly redundant arrays: digital reconstruction methods", Applied Optics, vol. 20, No. 10, May 15, 1981, pp. 1858-1864.

Fenimore, E.E., et al., "Fast delta Hadamard transformation", Applied Optics, vol. 20, No. 17, Sep. 1, 1981, pp. 3058-3067.

Fenimore, E.E., et al., "Large symmetric $\pi$ transformations for Hadamard transformations", Applied Optics, vol. 22, No. 6, Mar. 15, 1983, pp. 826-829.

Fenimore, E.E., et al., "Time-resolved and energy-resolved coded aperture images with URA tagging", Applied Optics, vol. 26, No. 14, Jul. 15, 1987, pp. 2760-2769.

Gottesman, S., et al., "New family of binary arrays for coded aperture imaging", Applied Optics, vol. 28, No. 20, Oct. 15, 1989, pp. 4344-4352.

Fenimore, E.E., et al., "Comparison of Fresnel Zone Plates and Uniformly Redundant Arrays", SPIE, vol. 149, Applications of Digital Image Processing, Aug. 28-29,236. 1978, pp. 232-236.

Busboom, A., "Arrays and Rekonstruktions- algortihmen für bildgebende System emit codierter Apertur", Relevant Chapters 1-5, pp. 128, Translation Included: Busboom, A., "Arrays and reconstruction algorithms for coded aperture imaging systems", vol. 10, No. 572, Translated Chapters, Ch.1-5, pp. 36.

Office Action from U.S. Appl. No. 11/210,098, mailed Aug. 21, 2008, 10 pgs.

Office Action from U.S. Appl. No. 11/210,098, mailed Mar. 31, 2008, 8 pgs.

Office Action from U.S. Appl. No. 11/210,098, mailed Jan. 29, 2007, 9 pgs.

Office Action from U.S. Appl. No. 11/210,098, mailed Jun. 22, 2006, 8 pgs.

Office Action from U.S. Appl. No. 11/899,814, mailed Jul. 29, 2008, 8 pgs.

Office Action from U.S. Appl. No. 11/899,814, mailed Mar. 7, 2008, 13 pgs.

Notification of Transmittal of the International Search Report and the Written Opinion of the International Searching Authority, or the Declaration from Counterpart PCT Patent No. PCT/US06/01111, dated Aug. 3, 2006, 13 pgs.

Notification Concerning Transmittal of International Preliminary Report on Patentability (Chapter I of the Patent Cooperation Treaty) and Written Opinion of the International Searching Authority from Counterpart PCT Patent No. PCT/US06/01111, dated Aug. 3, 2006, 13 pgs.

Office Action from U.S. Appl. No. 11/210,098, mailed Jan. 13, 2009, 6 pgs.

Office Action from U.S. Appl. No. 11/899,814, mailed Mar. 3, 2009, 8 pgs.

Office Action from U.S. Appl. No. 11/899,814, mailed Aug. 17, 2009, 10 pgs.

Issue Fee from U.S. Appl. No. 11/210,098, mailed Oct. 21, 2009, 10 pgs.

* cited by examiner

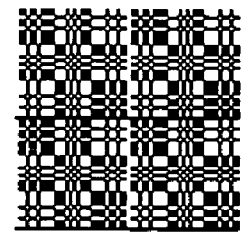
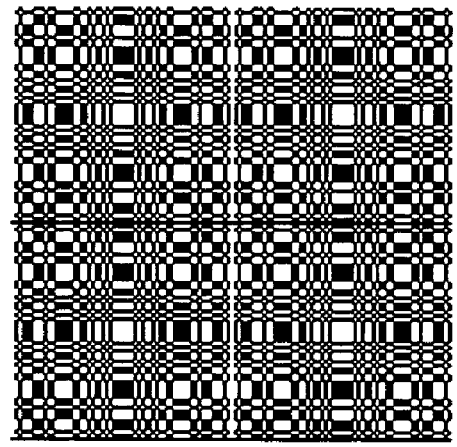
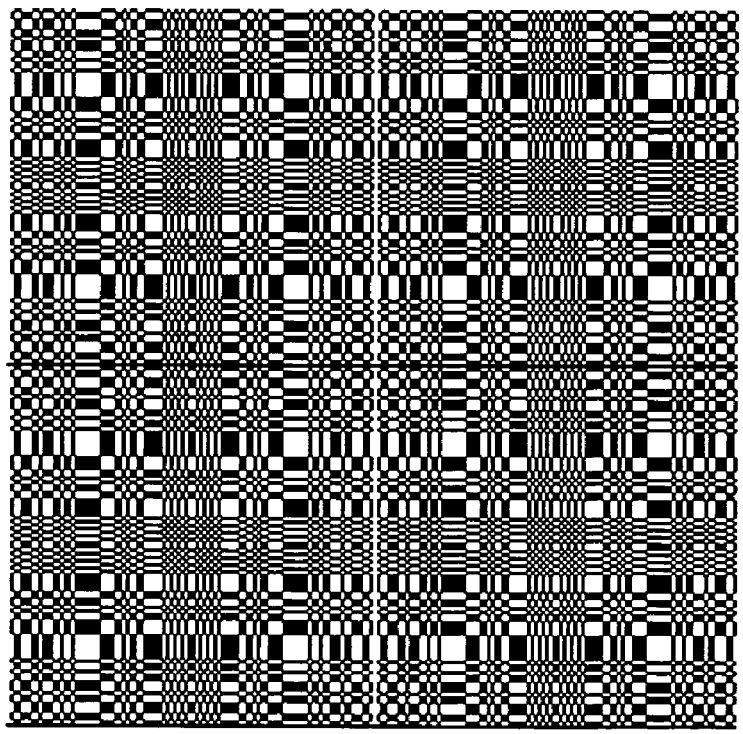
FIG. 4

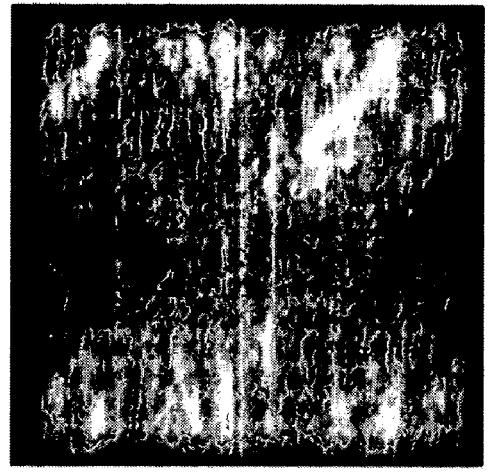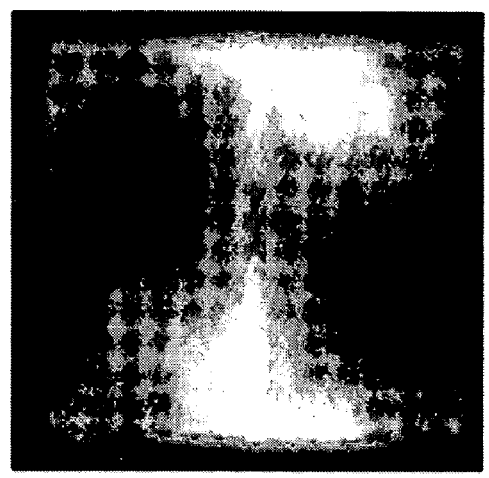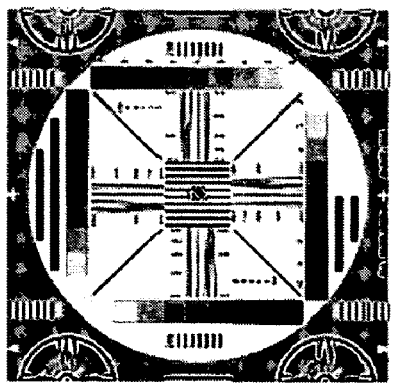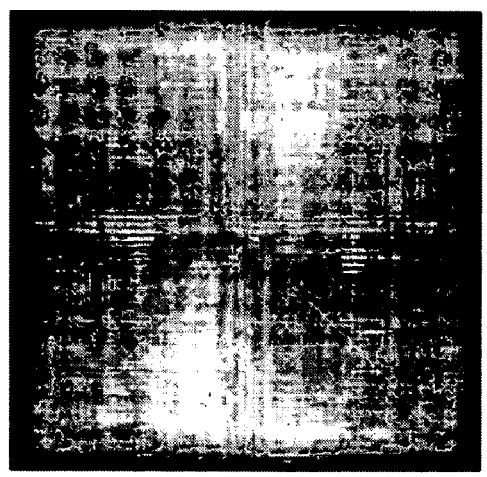
FIG. 14

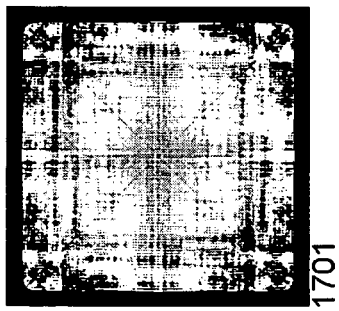
1701
Range = 100 mm
m/s = 1.32
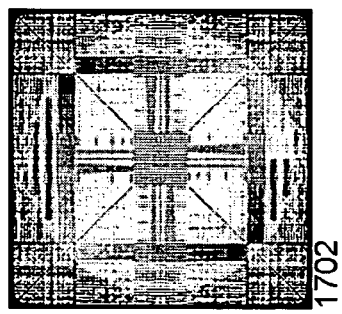
1702
Range = 500 mm
m/s = 1.61
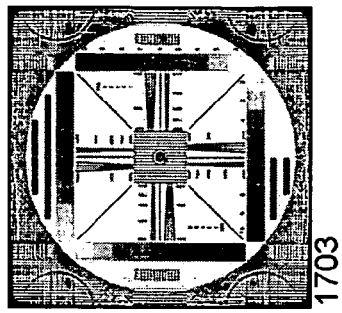
1703
Range = 900 mm
m/s = 1.84
Fig. 17a
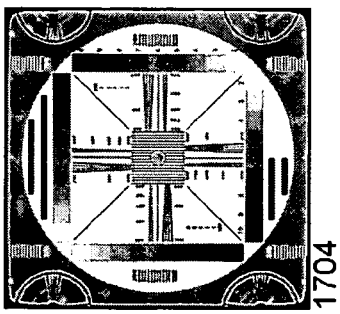
1704
Range = 1,000 mm
m/s = 2.00
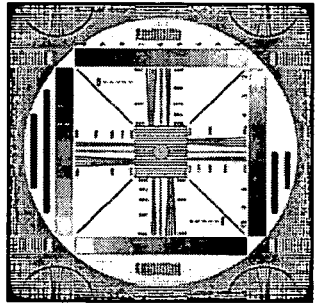
1705
Range = 1,100 mm
m/s = 1.86
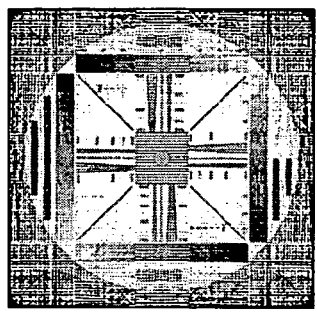
1706
Range = 2,000 mm
m/s = 1.67
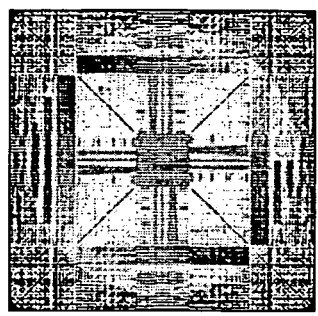
1707
Range = infinity
m/s = 1.65
Fig. 17b

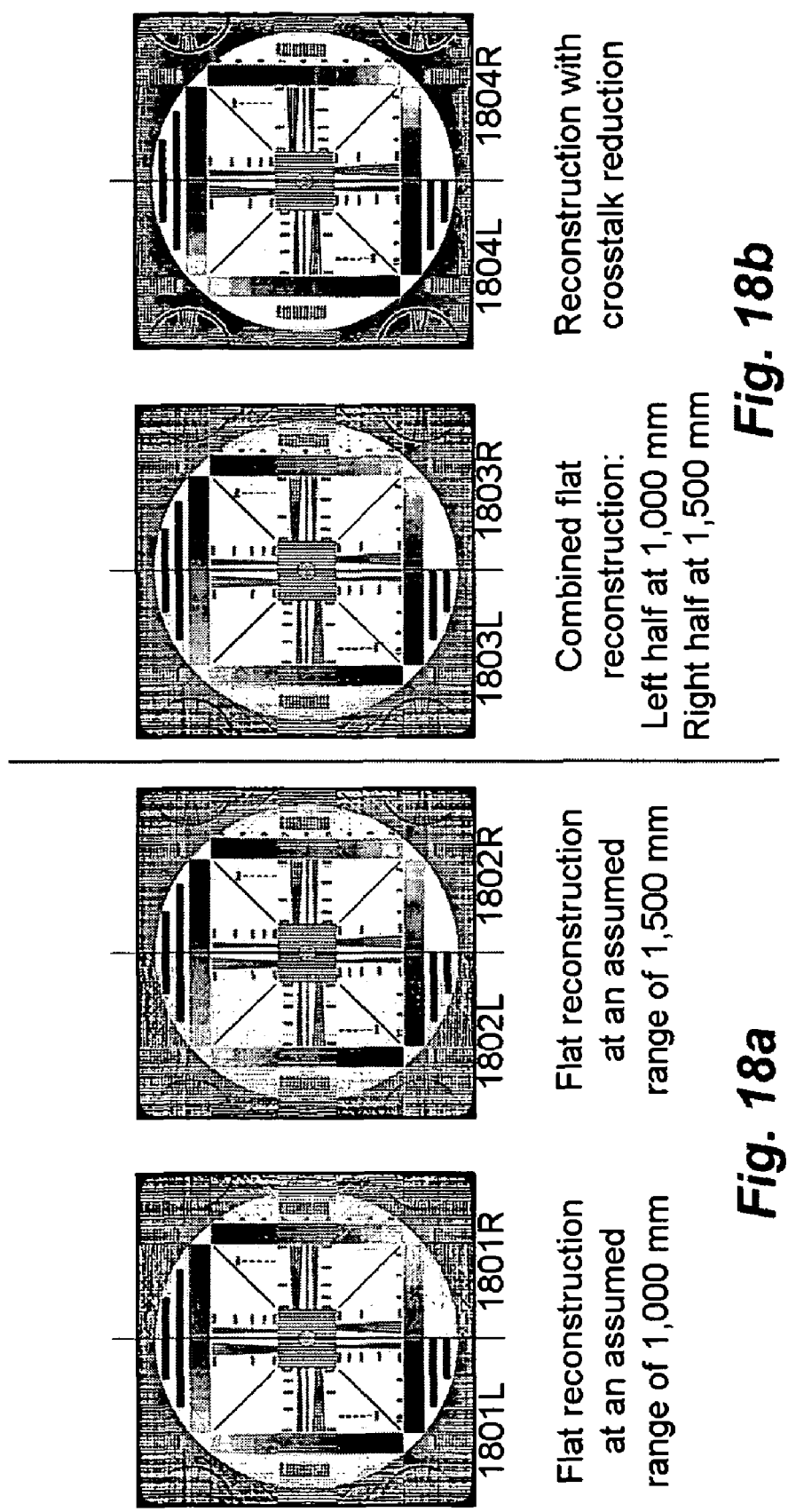

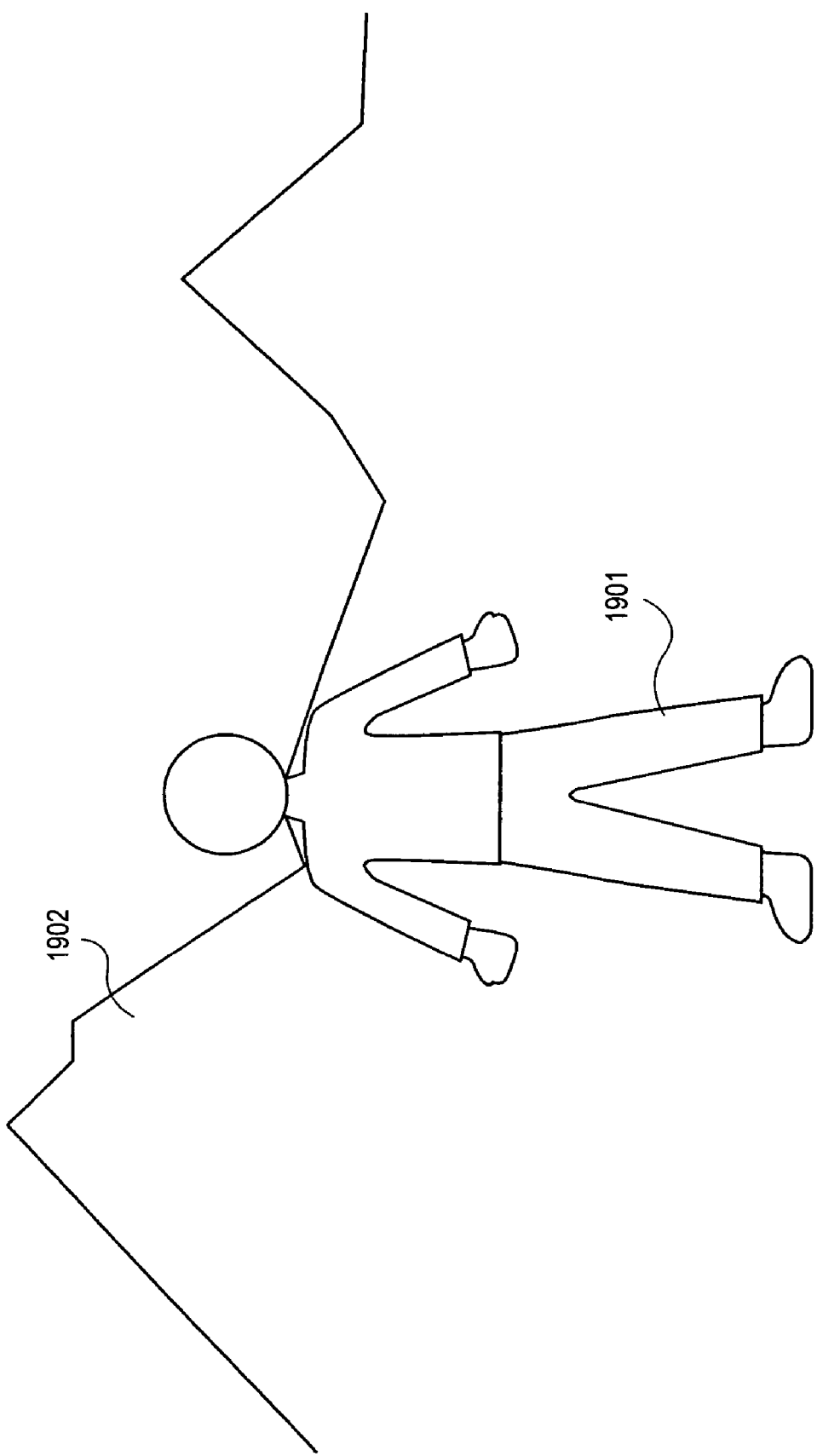

APPARATUS AND METHOD FOR CAPTURING STILL IMAGES AND VIDEO USING CODED APERTURE TECHNIQUES

BACKGROUND OF THE INVENTION

1. Field of the Invention

This invention relates generally to the field of image capture and image processing. More particularly, the invention relates to an apparatus and method for capturing still images and video using coded aperture techniques.

2. Description of the Related Art

Photographic imaging is commonly done by focusing the light coming from a scene using a glass lens which is placed in front of a light sensitive detector such as a photographic film or a semiconductor sensor including CCD and CMOS sensors.

For imaging high-energy radiation such as x-ray or gamma rays, other techniques must be used because such radiation cannot be diffracted using glass lenses. A number of techniques have been proposed including single pinhole cameras and multi-hole collimator systems. A particularly beneficial technique is "coded aperture imaging" wherein a structured aperture, consisting of a suitably-chosen pattern of transparent and opaque elements, is placed in front of a detector sensitive to the radiation to be imaged. When the aperture pattern is suitably chosen, the imaged scene can be digitally reconstructed from the detector signal. Coded aperture imaging has the advantage of combining high spatial resolution with high light efficiency. Coded aperture imaging of x-ray and gamma ray radiation using structured arrays of rectangular or hexagonal elements is known from R. H. DICKE: SCATTER-HOLE CAMERA FOR X-RAYS AND GAMMA RAYS. ASTROHYS. J., 153:L101-L106, 1968 (hereinafter "Dicke"), and has been extensively applied in astronomical imaging and nuclear medicine.

A particularly useful class of coded imaging systems is known from E. E. FENIMORE AND T. M. CANNON: CODED APERTURE IMAGING WITH UNIFORMLY REDUNDANT ARRAYS. APPL. OPT., 17:337-347, 1978 (hereinafter "Fenimore"). In this class of systems, a basic aperture pattern is cyclically repeated such that the aperture pattern is a 2×2 mosaic of the basic pattern. The detector has at least the same size as the basic aperture pattern. In such a system, the "fully coded field-of-view" is defined as the area within the field-of-view, within which a point source would cast a complete shadow of a cyclically shifted version of the basic aperture pattern onto the aperture. Likewise, the "partially coded field-of-view" is defined as the area within the field-of-view, within which a point source would only cast a partial shadow of the basic aperture pattern onto the aperture. According to Dicke, a collimator is placed in front of the detector which limits the field-of-view to the fully coded field-of-view, thus allowing an unambiguous reconstruction of the scene from the detector signal.

From J. GUNSON AND B. POLYCHRONOPULOS: OPTIMUM DESIGN OF A CODED MASK X-RAY TELESCOPE FOR ROCKET APPLICATIONS. MON. NOT. R. ASTRON. SOC., 177:485-497, 1976 (hereinafter "Gunson") it is further known to give the opaque elements of the aperture a finite thickness such that the aperture itself acts as a collimator and limits the field-of-view to the fully coded field-of-view. Such a "self-collimating aperture" allows the omission of a separate collimator in front of the detector.

It should be noted that besides limiting the field-of-view, a collimator has the undesired property of only transmitting light without attenuation which is exactly parallel to the optical axis. Any off-axis light passing through the collimator is attenuated, the attenuation increasing towards the limits of the field-of-view. At the limits of the field-of-view, the attenuation is 100%, i.e., no light can pass through the collimator at such angles. This effect will be denoted as "collimator attenuation" within this document. Both in the x-direction and in the y-direction, collimator attenuation is proportional to the tangent of the angle between the light and the optical axis.

In addition, there is also a "photometric attenuation" of light being imaged at off-axis angles. This results from the fact that the surface normal of the light-emitting or light-scattering object and the surface normal of the light-sensitive sensor is at an angle towards each other. The light reaching the sensor is known to be proportional to the square of the cosine of the angle between the two surface normals.

After reconstructing an image from a sensor signal in a coded aperture imaging system, the effects of collimator attenuation and photometric attenuation may have to be reversed in order to obtain a photometrically correct image. This involves multiplying each individual pixel value with the inverse of the factor by which light coming from the direction which the pixel pertains to, has been attenuated. It should be noted that close to the limits of the field-of-view, the attenuation, especially the collimator attenuation, is very high, i.e. this factor approaches zero. Inverting the collimator and photometric attenuation in this case involves amplifying the pixel values with a very large factor, approaching infinity at the limits of the field-of-view. Since any noise in the reconstruction will also be amplified by this factor, pixels close to the limits of the field-of-view may be very noisy or even unusable.

In a coded aperture system according to Fenimore or Gunson, the basic aperture pattern can be characterized by means of an "aperture array" of zeros and ones wherein a one stands for a transparent and a zero stands for an opaque aperture element. Further, the scene within the field-of-view can be characterized as a two-dimensional array wherein each array element contains the light intensity emitted from a single pixel within the field-of-view. When the scene is at infinite distance from the aperture, it is known that the sensor signal can be characterized as the two-dimensional, periodic cross-correlation function between the field-of-view array and the aperture array. It should be noted that the sensor signal as such has no resemblance with the scene being imaged. However, a "reconstruction filter" can be designed by computing the two-dimensional periodic inverse filter pertaining to the aperture array. The two-dimensional periodic inverse filter is a two-dimensional array which is constructed in such a way that all sidelobes of the two-dimensional, periodic cross-correlation function of the aperture array and the inverse filter are zero. By computing the two-dimensional, periodic cross-correlation function of the sensor signal and the reconstruction filter, an image of the original scene can be reconstructed from the sensor signal.

It is known from Fenimore to use a so-called "Uniformly Redundant Arrays" (URAs) as aperture arrays. URAs have a two-dimensional, periodic cross-correlation function whose sidelobe values are all identical. URAs have an inverse filter which has the same structure as the URA itself, except for a constant offset and constant scaling factor. Such reconstruction filters are optimal in the sense that any noise in the sensor signal will be subject to the lowest possible amplification during the reconstruction filtering. However, URAs can be algebraically constructed only for very few sizes.

It is further known from S. R. GOTTESMAN AND E. E. FENIMORE: NEW FAMILY OF BINARY ARRAYS FOR CODED APERTURE IMAGING. APPL. OPT., 28:4344-4352, 1989 (hereinafter "Gottesman") to use a modified class of aperture arrays called "Modified Uniformly Redundant Arrays" (MURAs) which exist for all sizes p×p where p is an odd prime number. Hence, MURAs exist for many more sizes than URAs. Their correlation properties and noise amplification properties are near-optimal and almost as good as the properties of URAs. MURAs have the additional advantage that, with the exception of a single row and a single column, they can be represented as the product of two one-dimensional sequences, one being a function only of the column index and the other being a function only of the row index to the array. Likewise, with the exception of a single row and a single column, their inverse filter can also be represented as the product of two one-dimensional sequences. This property permits to replace the two-dimensional in-verse filtering by a sequence of two one-dimensional filtering operations, making the reconstruction process much more efficient to compute.

If the scene is at a finite distance from the aperture, a geometric magnification of the sensor image occurs. It should be noted that a point source in the scene would cast a shadow of the aperture pattern onto the sensor which is magnified by a factor of $f=(o+a)/o$ compared to the actual aperture size where o is the distance between the scene and the aperture and a is the distance between the aperture and the sensor. Therefore, if the scene is at a finite distance, the sensor image needs to be filtered with an accordingly magnified version of the reconstruction filter.

If the scene is very close to the aperture, so-called near-field effects occur. The "near field" is defined as those ranges which are less than 10 times the sensor size, aperture size or distance between aperture and sensor, whichever of these quantities is the largest. If an object is in the near field, the sensor image can no longer be described as the two-dimensional cross-correlation between the scene and the aperture array. This causes artifacts when attempting to reconstructing the scene using inverse filtering. In Lanza, et al., U.S. Pat. No. 6,737,652, methods for reducing such near-field artifacts are disclosed. These methods involve imaging the scene using two separate coded apertures where the second aperture array is the inverse of the first aperture array (i.e. transparent elements are replaced by opaque elements and vice versa). The reconstruction is then computed from two sensor signals acquired with the two different apertures in such a manner that near-field artifacts are reduced in the process of combining the two sensor images.

Coded aperture imaging to date has been limited to industrial, medical, and scientific applications, primarily with x-ray or gamma-ray radiation, and systems that have been developed to date are each designed to work within a specific, constrained environment. For one, existing coded aperture imaging systems are each designed with a specific view depth (e.g. effectively at infinity for astronomy, or a specific distance range for nuclear or x-ray imaging). Secondly, to date, coded aperture imaging has been used with either controlled radiation sources (e.g. in nuclear, x-ray, or industrial imaging), or astronomical radiation sources that are relatively stable and effectively at infinity. As a result, existing coded aperture systems have had the benefit of operating within constrained environments, quite unlike, for example, a typical photographic camera using a lens. A typical photographic camera using a lens is designed to simultaneously handle imaging of scenes containing 3-dimensional objects with varying distances from close distances to effective infinite distance; and is designed to image objects reflecting, diffusing, absorbing, refracting, or retro-reflecting multiple ambient radiation sources of unknown origin, angle, and vastly varying intensities. No coded aperture system has ever been designed that can handle these types of unconstrained imaging environments that billions of photographic cameras with lenses handle everyday.

Photographic imaging in the optical spectrum using lenses has a number of disadvantages and limitations. The main limitation of lens photography is its finite depth of field-of-view. Only scenes at a single depth can be in focus in a lens image while any objects closer or further away from the camera than the in-focus depth will appear blurred in the image.

Further, a lens camera must be manually or automatically focused before an image can be taken. This is a disadvantage when imaging objects which are moving fast or unexpectedly such as in sports photography or photography of children or animals. In such situations, the images may be out of focus because there was not enough time to focus or because the object moved unexpectedly when acquiring the image. Lens photography does not allow a photographer to retrospectively change the focus once an image has been acquired.

Still further, focusing a lens camera involves adjusting the distance between one or more lenses and the sensor. This makes it necessary for a lens camera to contain mechanically moving parts which makes it prone to mechanical failure. Various alternatives to glass lenses, such as liquid lenses (see, e.g., B. HENDRIKS & STEIN KUIPER: THROUGH A LENS SHARPLY. IEEE SPECTRUM, DECEMBER, 2004), have been proposed in an effort to mitigate the mechanical limitations of a glass lens, but despite the added design complexity and potential limitations (e.g., operating temperature range and aperture size) of such alternatives, they still suffer from the limitation of a limited focus range.

Moreover, for some applications the thickness of glass lenses causes a lens camera to be undesirably thick and heavy. This is particularly true for zoom lenses and for telephoto lenses such as those used in nature photography or sports photography. Additionally, since high-quality lenses are made of glass, they are fragile and prone to scratches.

Still further, lens cameras have a limited dynamic range as a result of their sensors (film or semiconductor sensors) having a limited dynamic range. This is a severe limitation when imaging scenes which contain both very bright areas and very dark areas. Typically, either the bright areas will appear overexposed while the dark areas have sufficient contrast, or the dark areas will appear underexposed while the bright areas have sufficient contrast. To address this issue, specialized semiconductor image sensors (e.g. the D1000 by Pixim, Inc. of Mountain View, Calif.) have been developed that allow each pixel of an image sensor to sampled each with a unique gain so as to accommodate different brightness regions in the image. But such image sensors are much more expensive than conventional CCD or CMOS image sensors, and as such are not cost-competitive for many applications, including mass-market general photography.

Because of the requirement to focus, lenses can provide a rough estimate of the distance between the lens and a subject object. But since most photographic applications require lenses designed to have as long a range of concurrent focus as possible, using focus for a distance estimate is extremely imprecise. Since a lens can only be focused to a single distance range at a time, at best, a lens will provide an estimate of the distance to a single object range at a given time.

SUMMARY OF THE INVENTION

A system and method are described in which photography of unconstrained scenes in the optical spectrum is implemented using coded aperture imaging techniques.

BRIEF DESCRIPTION OF THE DRAWINGS

A better understanding of the present invention can be obtained from the following detailed description in conjunction with the drawings, in which:

FIG. 4 illustrates three exemplary MURA patterns employed in accordance with the underlying principles of the invention.

FIG. 14 illustrates examples of flat scenes (i.e. scenes with no depth) and adjusted sensor images that result from them.

FIG. 17a-b illustrate a reconstruction of an image at different ranges to identify the correct range.

FIGS. 18a-b illustrate a reconstruction process according to one embodiment of the invention.

FIG. 19 illustrates an image in which a person is standing close to a camera, while mountains are far behind the person.

DETAILED DESCRIPTION

A system and method for capturing still images and video using coded aperture techniques is described below. In the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Camera System Architecture

Figure 1:
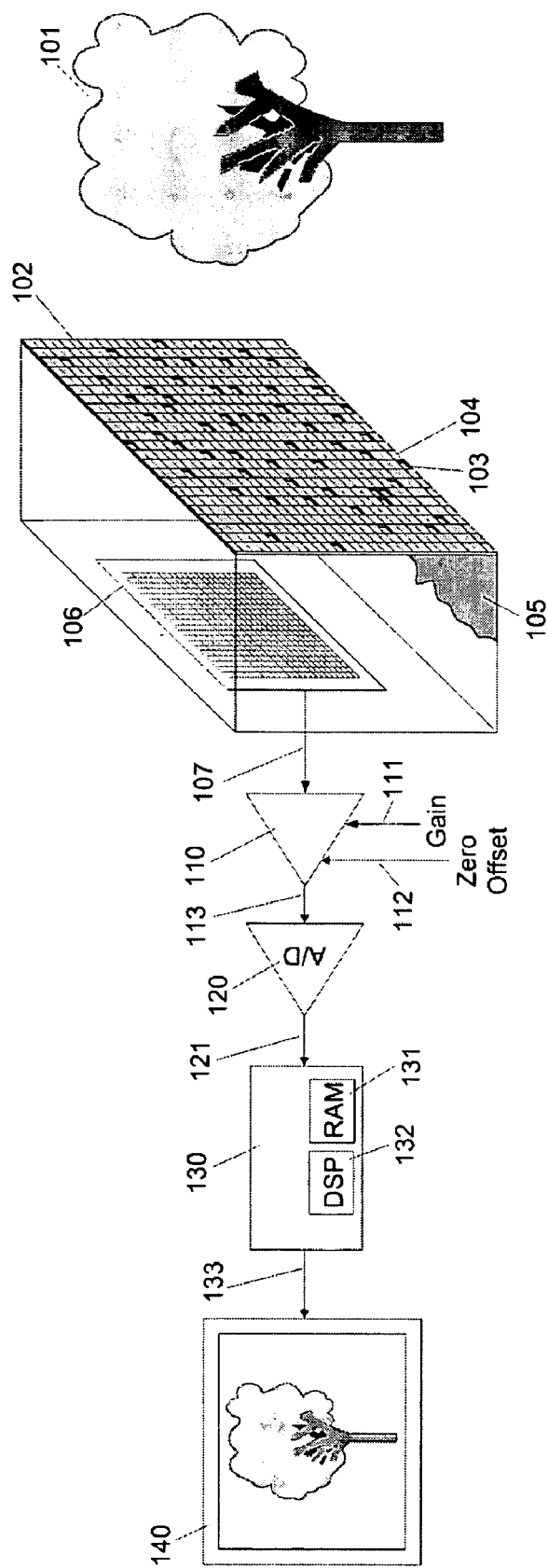
FIG. 1 illustrates a visible light coded aperture camera according to one embodiment of the invention.

A visible light coded aperture camera according to one embodiment of the invention is illustrated in FIG. 1. The illustrated embodiment includes a coded aperture 102 placed in front of a light sensitive grayscale or color semiconductor sensor 106. The coded aperture 102 is a pattern of circular, square or rectangular elements, some of which are transparent to visible light (e.g. element 103) and some of which are opaque (e.g. element 104). Note that for illustration clarity purposes, coded aperture 102 has very few transparent elements. A typical coded aperture may have significantly more transparent elements (e.g., 50%). Visible light a from 2-dimensional or 3-dimensional scene 101 (which may be illuminated by ambient or artificial lighting) is projected through the coded aperture 102 onto image sensor 106. The camera is capable of limiting the field-of-view to the fully coded field-of-view projected onto the sensor. In one embodiment, this is implemented by the use of a self-collimating coded aperture 102 (self-collimation is explained below). The space between the coded aperture and the sensor is shielded by a light-opaque housing 105 (only the outline of which is shown in FIG. 1), preventing any light from reaching the sensor other than by passing through an open element of the coded aperture.

The camera further includes an image sensor readout subsystem 110 with an interface 107 to the image sensor 105 (which may be similar to those used in prior coded aperture systems). The readout subsystem clocks out the analog image signal from the image sensor 106 and applies analog buffering, amplification and/or filtering as required by the particular image sensor. An example of such a readout subsystem 110 that also incorporates A/D 120 is the NDX-1260 CleanCapture Image Processor by NuCore Technology, Inc. of Sunnyvale, Calif. The ability to adjust the zero offset 112 and gain 111 to analog pixel values read by the readout subsystem 110 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 110 is coupled by interface 113 to at least one analog-to-digital converter (A/D) 120 which digitizes the analog output. The output of the A/D is coupled via interface 121 to an image reconstruction processor 130, which in one embodiment incorporates a Digital Signal Processor (DSP) 132 and Random Access Memory (RAM) 131. The digitized image from the interface 121 is stored in RAM 131, and the DSP 132 post-processes the image so as to reconstruct the original scene 101 into a grayscale or color image. In accordance with another embodiment, the image reconstruction processor 130 incorporates a general purpose CPU such as an Intel Corporation Pentium 4®, or similar general purpose processor. In yet another embodiment, the image reconstruction processor 130 incorporates an Application-Specific Integrated Circuit ("ASIC") which implements part or all of the reconstruction processing in dedicated digital structures. This grayscale or color image reconstructed by reconstruction processor 130 is output through interface 133 to be displayed on a display device 140.

Note that the camera illustrated in FIG. 1 does not require a lens of any sort. Also, no special imaging conditions are required (e.g., no controlled positioning of the camera or objects in the scene nor controlled lighting is required). Further, the camera is capable of imaging 3-dimensional real-world scenes (i.e., scenes containing objects with unknown and varying ranges). In short, the camera illustrated in FIG. 1 can be used in the same way as a conventional lens camera.

Figure 2:
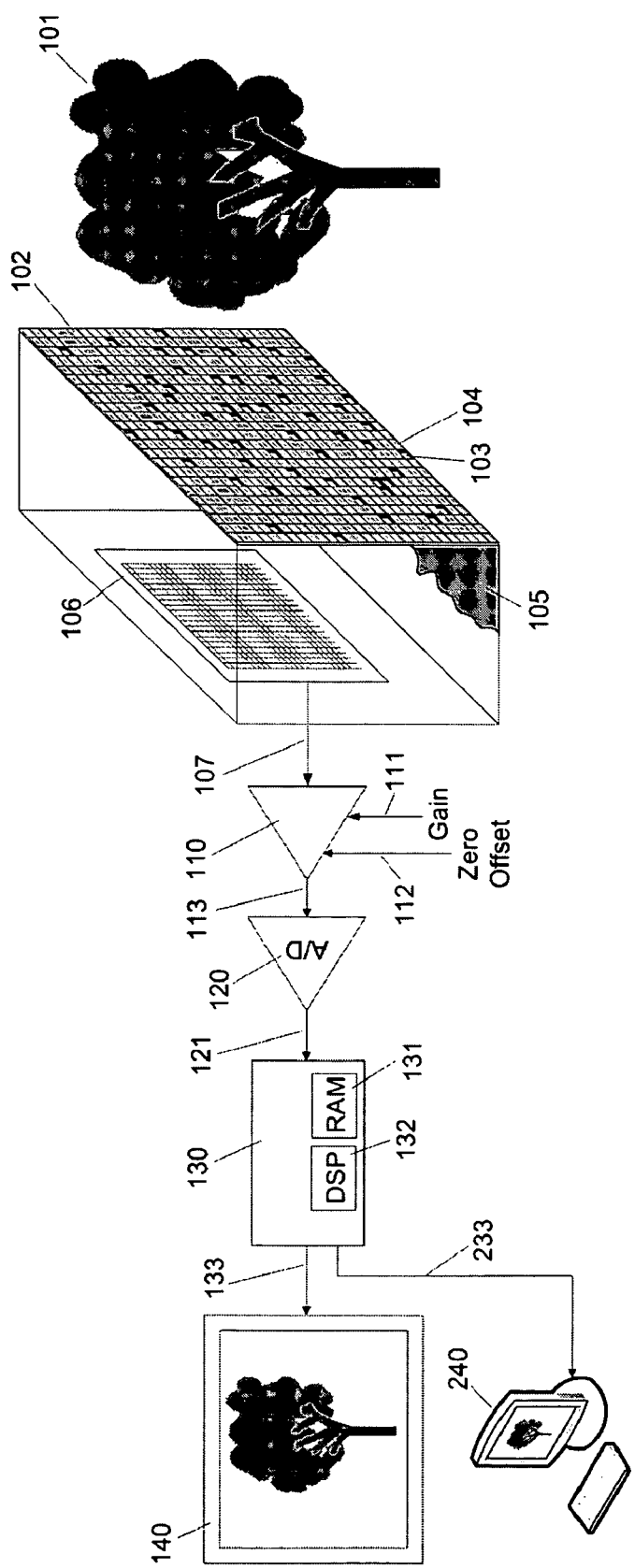
FIG. 2 illustrates a visible light coded aperture camera according to another embodiment of the invention.

According to one embodiment illustrated in FIG. 2, the resulting output 133 from the reconstruction processor is a 2-dimensional array of grayscale or color pixels representing the scene within the field of view of the camera. In one embodiment, the pixel data is transmitted through digital interface 233 to a computer 240 (or other image processing device). Thus, the output of the coded aperture camera will appear to any attached device as if it is the output of a conventional digital camera. Digital interface 233 for transferring the reconstructed image data may be any digital interface capable of handling the bandwidth from the camera for its required application such as for example, a IEEE1394 ("FireWire") interface or a USB 2.0 interface (which would be suitable for current still and video camera applications). Of course, the underlying principles of the invention are not limited to any particular interface 233. Preferably, the camera includes a display 140 (e.g., an LCD or OLED display), for presenting the reconstructed images to the photographer, but in this embodiment, display device 140 and interface 133 are optional.

Figure 3:
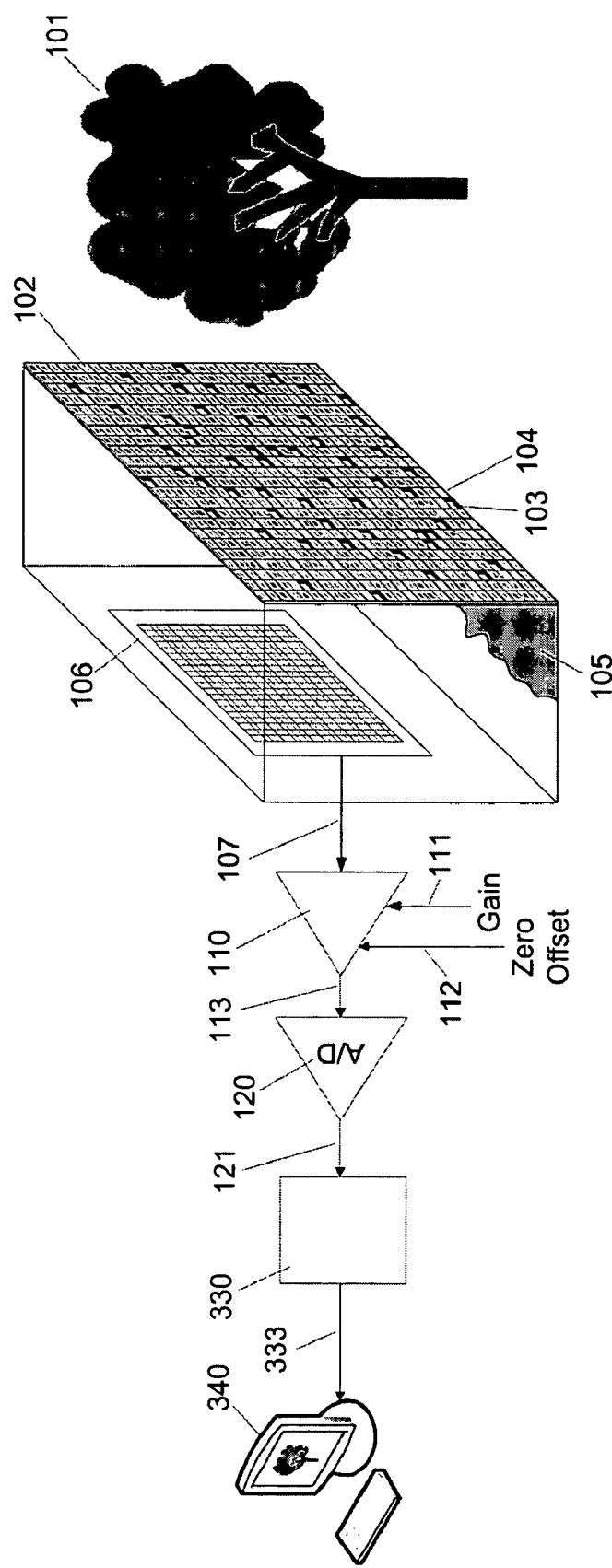
FIG. 3 illustrates a visible light coded aperture camera according to another embodiment of the invention.

According to one embodiment illustrated in FIG. 3, the camera does not include reconstruction processor 130. Instead, the digitized image data from the A/D converter 120 is coupled through interface 121 to output buffer 330 where the image data is packetized and formatted to be output through digital interface 333. Digital interface 333 would typically be coupled to an external computing means such as a personal computer 340, either to be processed and reconstructed immediately, or stored on a mass storage medium (e.g., magnetic or optical disc, semiconductor memory, etc.) for processing and reconstruction at a later time. Preferably, the external computing device 340 has a display for presenting the reconstructed images to the photographer. Alternatively, or in addition, interface 333 is coupled directly to a mass storage medium (e.g., magnetic or optical disc, semiconductor memory, etc.). Digital interface 333 for transferring the reconstructed image data could be any digital interface capable of handling the bandwidth from the camera for its required application (e.g., IEEE1394 ("FireWire") interface or a USB 2.0 interface).

Aperture Pattern Construction

According to one embodiment of the invention, the aperture pattern 102 is a Modified Uniformly Redundant Array ("MURA") pattern. The basic aperture pattern may be the same size as the sensor, and the overall aperture may be a 2×2 mosaic of this basic aperture pattern. Each transparent or opaque element of the aperture has at least the size of a pixel of the sensor. Three exemplary MURA patterns are illustrated in FIG. 4. MURA 101 is a 101×101 element pattern, MURA 61 is a 61×61 element pattern, and MURA 31 is a 31×31 element pattern. Each black area is opaque and each white area is transparent (open).

Aperture Fabrication

In one embodiment, the coded aperture consists of a glass wafer carrying a thin chromium layer. Upon manufacturing, the chromium layer carries a film of varnish which is sensitive to electron beams. The structure of the aperture is created by electron lithography. Specifically, the varnish is removed at the locations of the transparent aperture elements. Next, the chromium layer is cauterized in those locations not covered by varnish. The remaining varnish is then removed.

Aperture Pixel Size

In one embodiment, in order to allow an accurate reconstruction of the scene, an individual pixel of the sensor is no larger than an individual aperture element, magnified by the geometric scaling factor $f=(o+a)/o$, where o is the distance between the scene and the aperture and a is the distance between the aperture and the sensor. This factor is 1 if the object is at infinity and less than one if the object is at a finite distance. Therefore, if the sensor pixel size is chosen to be the same size as or smaller than an individual aperture element, objects at all distances can be reconstructed accurately.

If the size of an individual aperture element is in the order of magnitude of the wavelength of the light being imaged, the aperture may cause undesired wave-optical interference in addition to the desired effect of selectively blocking and transmitting the light. The wavelength of visible light is in the range between 380 nm and 780 nm. Preferably, the aperture dimensions are at least ten times as large as the longest wavelength to be imaged. Therefore, in one embodiment, the width or height of an individual aperture element is at least 7.8 microns to avoid wave-optical interference or diffraction effects.

Camera Field of View and Zoom

The distance between the coded aperture and the sensor determines the field-of-view of a coded aperture camera. A larger aperture-to-sensor separation will cause the field-of-view to be smaller at a higher spatial resolution, thus yielding a telephoto characteristic of the coded aperture camera. A smaller aperture-to-sensor separation will cause the field-of-view to be larger at a lower spatial resolution, thus yielding a wide-angle characteristic. According to one embodiment of the present invention, the distance between the aperture and the sensor is adjustable (either manually or automatically), allowing the field-of-view of the camera to be changed similar to a zoom lens. In one embodiment, this is achieved by an adjustment mechanism, such as a plate supported on guides and moved by rotating screws, which varies the distance between the aperture and the sensor. Such a mechanism is much simpler than that a conventional zoom lens because it simply requires a linear repositioning of the aperture, whereas a conventional zoom lens requires a complex re-arrangement of the internal optics of multiple glass lenses to maintain focus and image linearity across the surface of the film or image sensor as the focal length changes.

Figure 5:
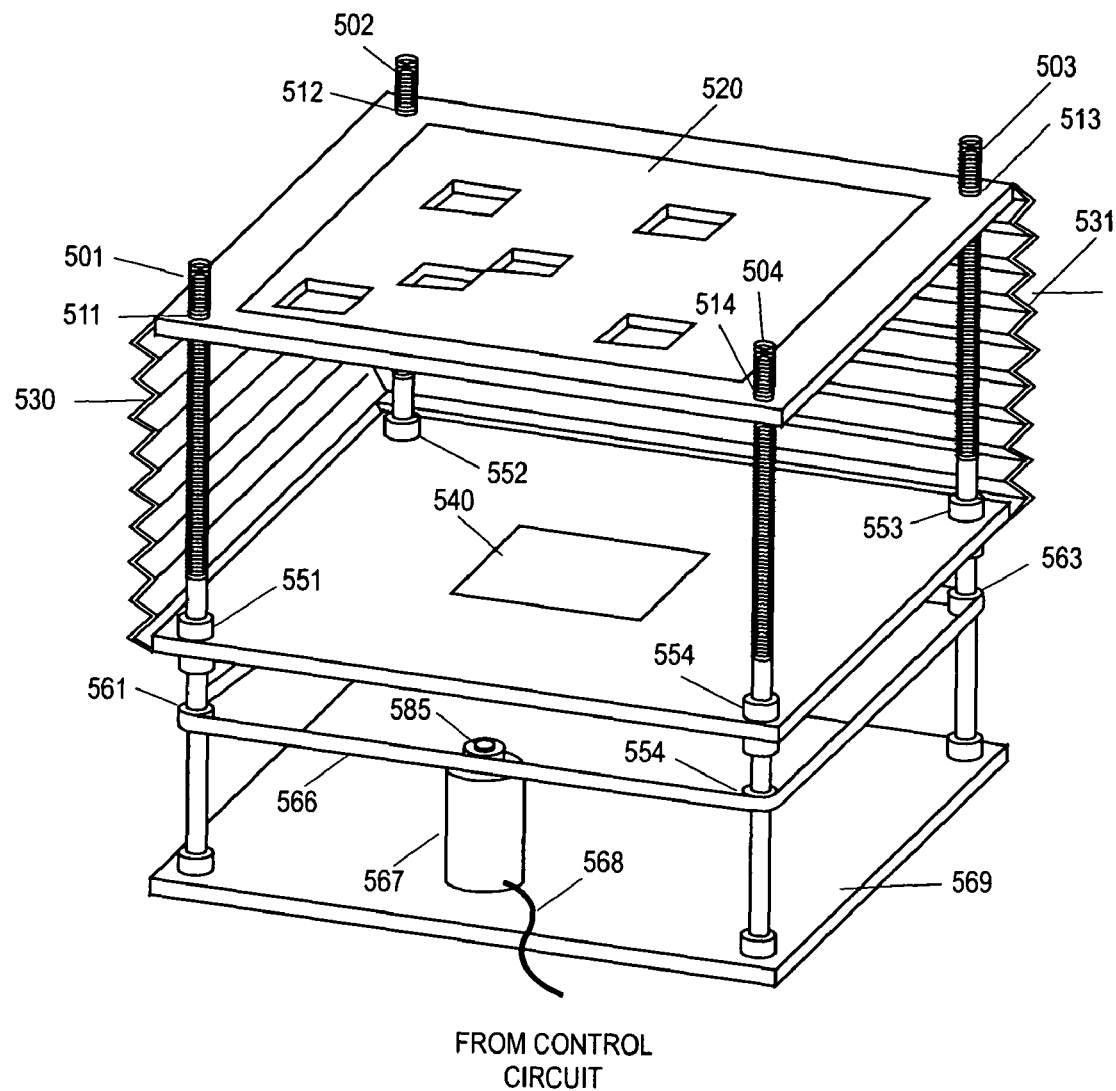
FIG. 5 illustrates one embodiment of an apparatus including a plate supported on guides and moved by rotating screws.

One embodiment of such a mechanism is shown in FIG. 5. A coded aperture 520 is mounted in a frame with 4 threaded holes 511-514. It should be noted that the open elements of the coded aperture are illustrated exaggerated in size to make it clear that they are open. In addition, there are far fewer open elements shown than there would be in a typical aperture. Shafts 501-504 with threaded ends are placed in threaded holes 511-514. Non-threaded parts of shafts 501-504 pass through non-threaded holes in a plate holding image sensor 540. The shafts 501-504 have collars 551-554 on each side of these holes to prevent the shafts from moving upward or downward through the holes. The shafts 501-504 also have pulleys 561-564 attached to them (one pulley on shaft 502 is not visible). A bi-directional electric motor 567 (e.g., a DC motor) has attached to its shaft a pulley 565. Belt 566 is wrapped around pulleys 561-564 and 565 and also around the non-visible pulley on shaft 502. Motor 567 and shafts 501-504 are secured to a base plate 569, such that the shafts 501-504 are free to rotate. A light-opaque bellows (partially shown on 2 sides as 530 and 531) surrounds the space between the coded aperture 520 frame and the image sensor 540. Only 2 sides of the bellows 530 and 531 are shown, but the bellows encapsulates the space on all 4 sides.

When electric current is applied to motor power input 568 the motor 567 shaft and pulley 565 rotates. Its direction of rotation is determined by the polarity of the electric current in one embodiment. When pulley 565 rotates, it moves belt 566, which in turn moves pulleys 561-564 as well as the non-visible pulley on shaft 502. This in turn rotates shafts 501-504, which causes the threaded holes 511-514 to move up or down the shafts 501-504, depending on the direction of rotation. As a result, the aperture 520 is moved further or closer to image sensor 540. When the aperture 520 is furthest from the image sensor 540, the projected image through the aperture is maximized in size, similar to the most telephoto extent of a conventional zoom lens. When aperture 520 is closest to image sensor 540, the projected image through the aperture is minimized in size, similar to the most wide-angle extent of a conventional zoom lens.

Aperture Collimation and Light Attenuation

One embodiment of the camera employs techniques to limit the field-of-view (FOV) to the fully coded field-of-view (FCFOV). Alternatively, the techniques of limiting the FOV may be dimensioned in such a way that the FOV is slightly larger than the FCFOV, i.e., in such a way that the FOV is composed of the FCFOV plus a small part of the partially coded field of view (PCFOV). This way, the FOV of a coded aperture camera can be increased at the expense of only a very minor degradation in image quality.

According to one embodiment, FOV limitation is achieved by placing a collimator, e.g., a prismatic film or a honeycomb collimator, in front of the imaging sensor. According to another embodiment, this is achieved by placing a collimator, e.g., a prismatic film (e.g. Vikuiti Brightness Enhancing Film II by 3M, Inc. of St. Paul, Minn.), or a honeycomb collimator, in front of or behind the coded aperture.

According to yet another embodiment, this is achieved by giving the coded aperture a finite thickness such that light can only pass through it at a limited range of angles with respect to the optical axis. Such a "self-collimating coded aperture" also has thin "walls" between adjacent open aperture elements with the same thickness as the closed aperture elements. In one embodiment, this is achieved by using electron lithography to fabricate an aperture out of a glass wafer with a layer of chromium in the desired thickness of the collimator. In one embodiment, an optical or x-ray lithographic technique such as that used in semiconductor manufacturing is used to fabricate an aperture with a metallic layer deposited in the desired thickness upon a glass substrate. Yet another embodiment uses photographic film (such as Kodak Professional E100 color reversal film) as the aperture. In this embodiment, the film is exposed with the aperture pattern, and it is processed through a normal film development process, to produce an optical pattern on the developed film. The thickness of the emulsion of the film defines the collimation thickness. A typical thickness of color photographic film is 7.6 microns.

Note that the thickness of the collimator or of the self-collimating coded aperture determines the size of the FOV: The thicker the collimator or the self-collimating coded aperture, the narrower the FOV of the coded aperture camera.

Figure 6:
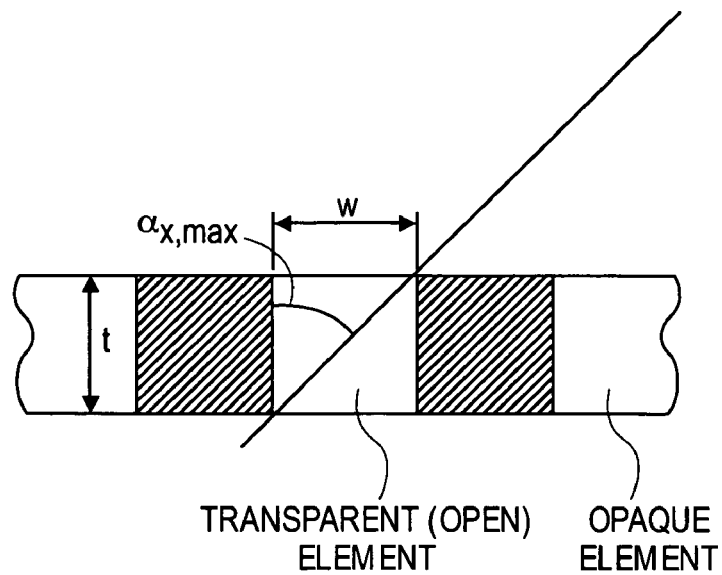
FIG. 6 illustrates a self-collimating thickness for a which given field of view is processed.

In one embodiment, the self-collimating thickness for a given field of view is calculated in the following manner. Referring to FIG. 6, let w, h and t denote the width, height, and thickness of an element of a self-collimating aperture, respectively (for simplicity, only the dimensions of thickness and width are shown). Then the largest angle $\alpha_{x,\,max}$ with respect to the optical axis at which light can pass through the self-collimating aperture in x-direction is given by $\tan \alpha_{x,\,max}$=w/t. Likewise, the largest angle $\alpha_{y,\,max}$ with respect to the optical axis at which light can pass through the self-collimating aperture in y-direction is give by $\tan \alpha_{y,\,max}$=h/t (not shown).

As detailed above, the thickness of a collimator or self-collimating coded aperture may be chosen slightly smaller than the optimum thickness calculated this way. This will cause the FOV of the coded aperture camera to be slightly wider then the FCFOV, i.e., the reconstructed image delivered by the camera will have more pixels, at the expense of only a very minor degradation in image quality.

Figure 7:
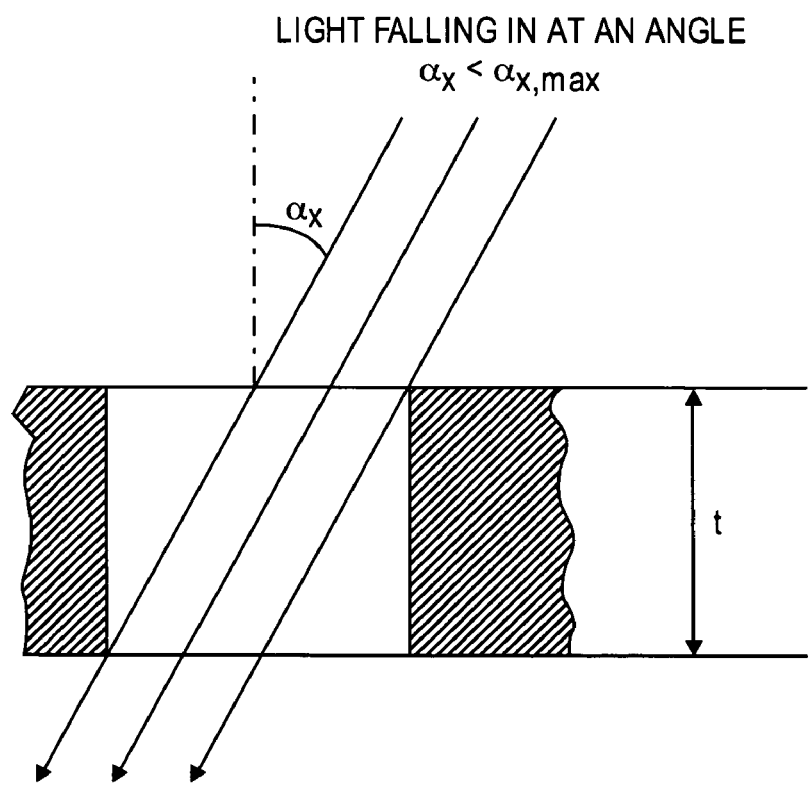
FIG. 7 illustrates light passing through a self-collimating aperture at an angle with respect to the optical axis.

When using a collimator or a self-collimating coded aperture, light passing through the self-collimating aperture parallel to the optical axis will not be attenuated. However, light passing through the self-collimating aperture at an angle with respect to the optical axis will be partially blocked by the self-collimating aperture, as illustrated in FIG. 7. In the x-direction only a fraction $|1-\tan \alpha_x/\tan \alpha_{x,\,max}|$ of the intensity at an angle $\alpha_x$ will pass through the aperture. Likewise, in the y-direction, only a fraction $|1-\tan \alpha_y/\tan \alpha_{y,\,max}|$ of the intensity at an angle $\alpha_y$ will pass through the aperture. For light having an angle with respect to the optical axis both in x-direction and in y-direction, the two fractions must be multiplied with each other. Thus, by using these formulations an appropriate thickness can be determined given the desired limits to the angle of light passing through the collimator.

Figure 8:
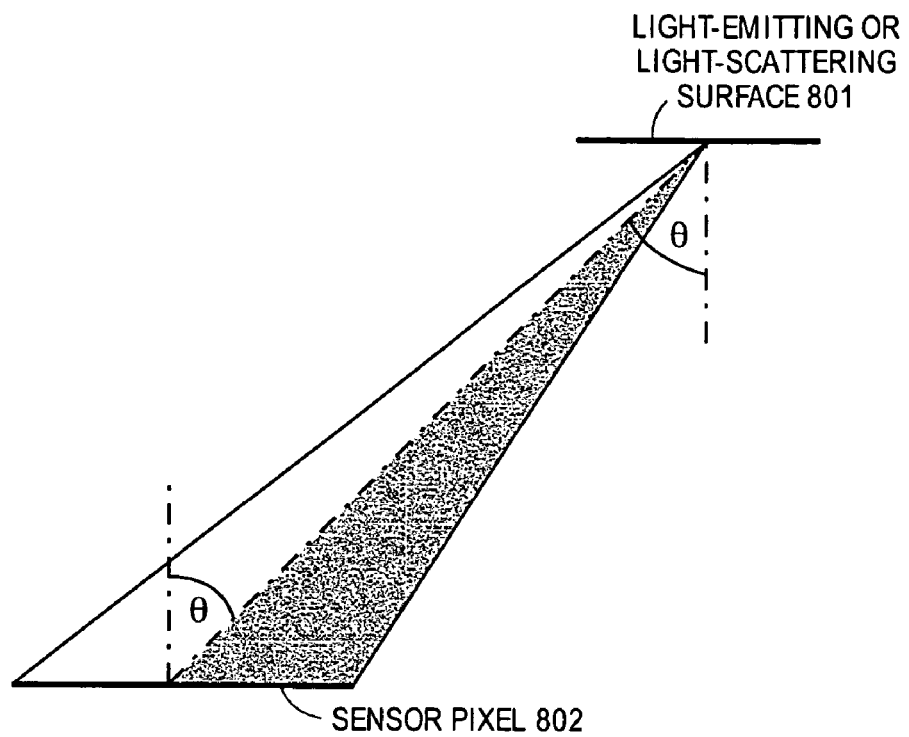
FIG. 8 illustrates a light emitting/scattering surface and a sensor pixel employed in one embodiment of the invention.

In addition to this "collimator attenuation" there is also a "photometric attenuation" resulting from the fact that a light-emitting (or light-scattering) surface and a light-sensitive surface are at an angle towards each other. Referring to FIG. 8, which illustrates light emitting/scattering surface 801 and a sensor pixel 802, let $\theta$ denote the angle of the light with respect to the optical axis. Then this photometric attenuation is known to be proportional to $\cos^2 \theta$.

As a result, after imaging and reconstructing a scene in a coded aperture camera, the sensitivity of the camera is higher in the center of the field-of-view (light parallel to the optical axis) than it is towards the edges of the field-of-view (larger angles with respect to the optical axis), both due to collimator attenuation and due to photometric attenuation. Thus, when imaging a constant-intensity surface, the reconstruction will be bright in the center and darker and darker towards the edges of the image. From the geometry of the system, the attenuation factor is known as described above. Therefore, in one embodiment of the invention, collimator attenuation and photometric attenuation are compensated for by multiplying each pixel of the reconstructed image with the inverse of the attenuation factors the pixel has been subjected to. This way, in the absence of any noise, a constant-intensity surface is reconstructed to a constant-intensity image.

It should be noted, however, that inverting the collimator attenuation and photometric attenuation also causes any noise in the reconstruction to be amplified with the same factor as the signal. Therefore, the signal-to-noise ratio (SNR) of the reconstructed image is highest in the center of the image and decreases towards the edges of the image, reaching the value zero at the edges of the field-of-view.

According to one embodiment of the invention, this problem is alleviated by using only a central region of the reconstructed image while discarding the periphery of the reconstructed image. According to another embodiment, the problem is further alleviated by applying a noise-reducing smoothing filter to image data at the periphery of the reconstructed image.

From the literature, Wiener filters are known to be optimum noise-reducing smoothing filters, given that the signal-to-noise ratio of the input signal to the Wiener filter is known. In the reconstructed image of a coded aperture camera, the signal-to-noise ratio varies across the image. The SNR is known for each pixel or each region of the reconstructed image. According to one embodiment, noise-reduction is achieved by applying a local Wiener filtering operation with the filter characteristic varying for each pixel or each region of the reconstructed image according to the known SNR variations.

Camera Sensor and Sensor Output Adjustments

Figure 9:
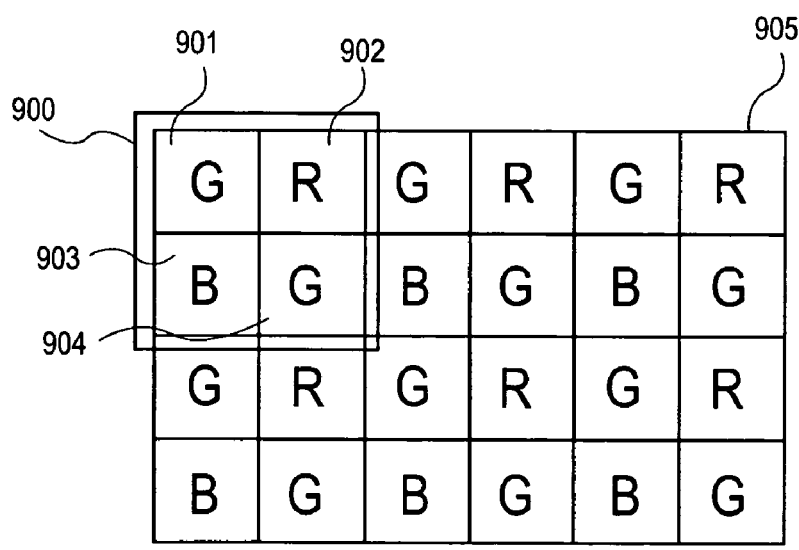
FIG. 9 illustrates an exemplary RGB Bayer Pattern employed in one embodiment with the invention.

According to one embodiment, the sensor 106 is a CCD sensor. More specifically, a color CCD sensor using a color filter array ("CFA"), also know as a Bayer pattern, is used for color imaging. A CFA is a mosaic pattern of red, green and blue color filters placed in front of each sensor pixel, allowing it to read out three color planes (at reduced spatial resolution compared to a monochrome CCD sensor). FIG. 9 illustrates an exemplary RGB Bayer Pattern. Each pixel cluster 900 consists of 4 pixels 901-904, with color filters over each pixel in the color of (G)reen, (R)ed, or (B)lue. Note that each pixel cluster in a Bayer pattern has 2 Green pixels (901 and 904), 1 Red (902) and 1 Blue (903). Pixel Clusters are typically packed together in an array 905 that makes up the entire CFA. It should be noted, however, that the underlying principles of the invention are not limited to a Bayer pattern.

Figure 10:
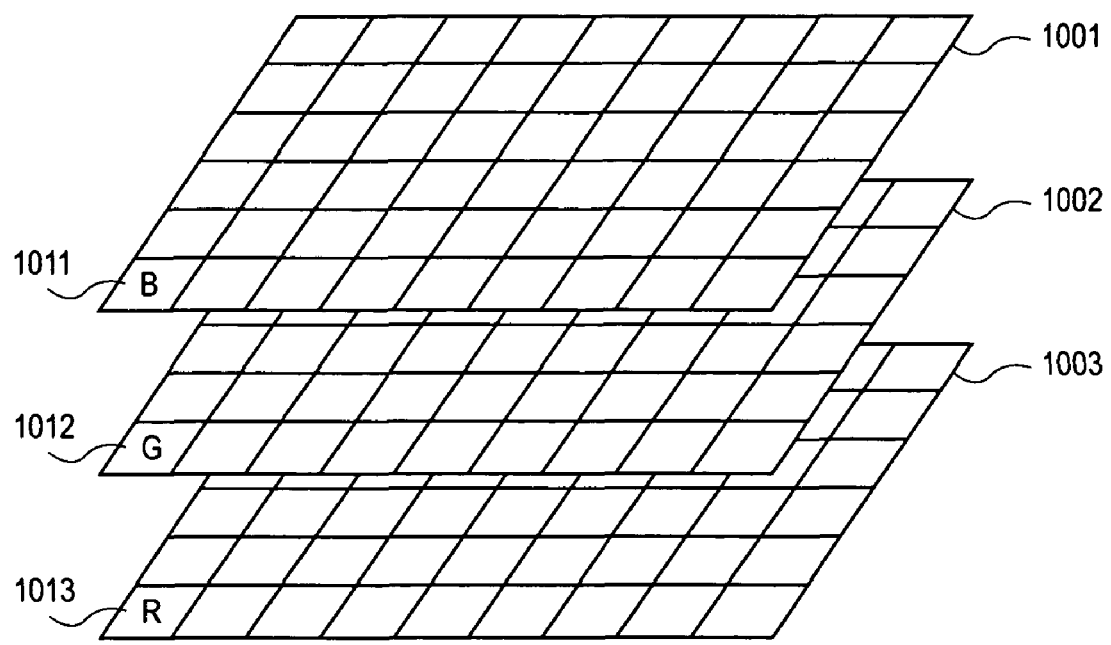
FIG. 10 illustrates image sensors implemented as a multi-layer structure and used in one embodiment of the invention.

In an alternative embodiment, a multi-layer color image sensor is used. Color sensors can be implemented without color filters by exploiting the fact that subsequent layers in the semiconductor material of the image sensor absorb light at different frequencies while transmitting light at other frequencies. For example, Foveon, Inc. of Santa Clara, Calif. offers "Foveon X3" image sensors with this multi-layer structure. This is illustrated in FIG. 10 in which semiconductor layer 1001 is an array of blue-sensitive pixels, layer 1002 is an array of green-sensitive pixels, and layer 1003 is an array of red-sensitive pixels. Signals can be read out from these layers individually, thereby capturing different color planes. This method has the advantage of not having any spatial displacement between the color planes. For example, pixels 1011-1013 are directly on top of one another and the red, green and blue values have no spatial displacement between them horizontally or vertically.

According to one embodiment of the present invention, each of the 3 RGB color planes are read out from a color imaging sensor (CFA or multi-layer) and are reconstructed individually. When a CFA color sensor is used, each aperture element should be at least the size of a single RGB cluster of pixels 900, rather than the size of an individual sensor pixel. In one embodiment, the reconstruction algorithms detailed below are applied individually to each of the 3 color planes, yielding 3 separate color planes of the reconstructed image. These can then be combined into a single RGB color image.

Figure 11A:
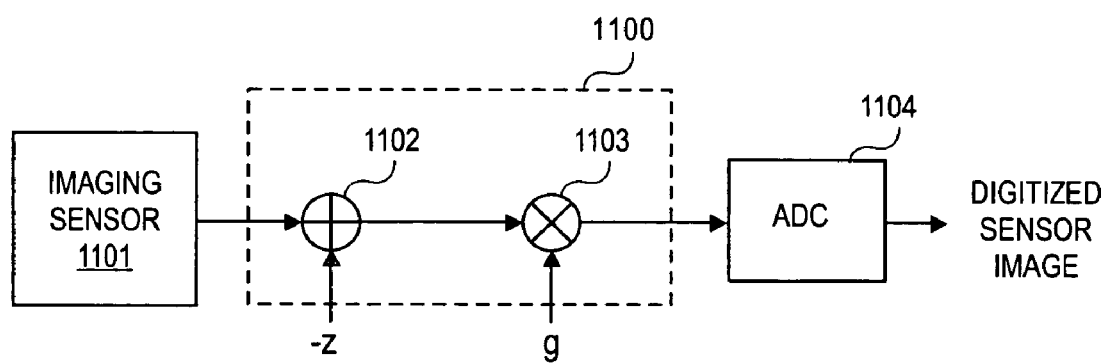
FIG. 11a illustrates one embodiment of the invention in which an output signal is digitized by an analog-to-digital converter (A/D) in order to allow digital image reconstruction and post-processing.

As illustrated in FIG. 11a, the analog output signal of imaging sensor 1101 is digitized by an analog-to-digital converter (A/D) 1104 in order to allow digital image reconstruction and post-processing. In order to exploit the full dynamic range of the A/D 1104, the sensor output is first amplified by an op amp 1100 before feeding it into the A/D. The op amp 1100 applies a constant zero offset z (1102) and a gain g (1103) to the image sensor 1101 output signal. The input signal to the A/D 1104 is s'=g (s−z) where s is the image sensor 1101 output signal. In one embodiment, offset 1102 and gain 1103 are chosen in such a way that the full dynamic range of the A/D 1104 is exploited, i.e., that the lowest possible sensor signal value $s_{min}$ corresponds to zero and the highest possible sensor signal value $s_{max}$ corresponds to the maximum allowed input signal of the A/D 1104 without the A/D 1104 going into saturation.

Figure 11B:
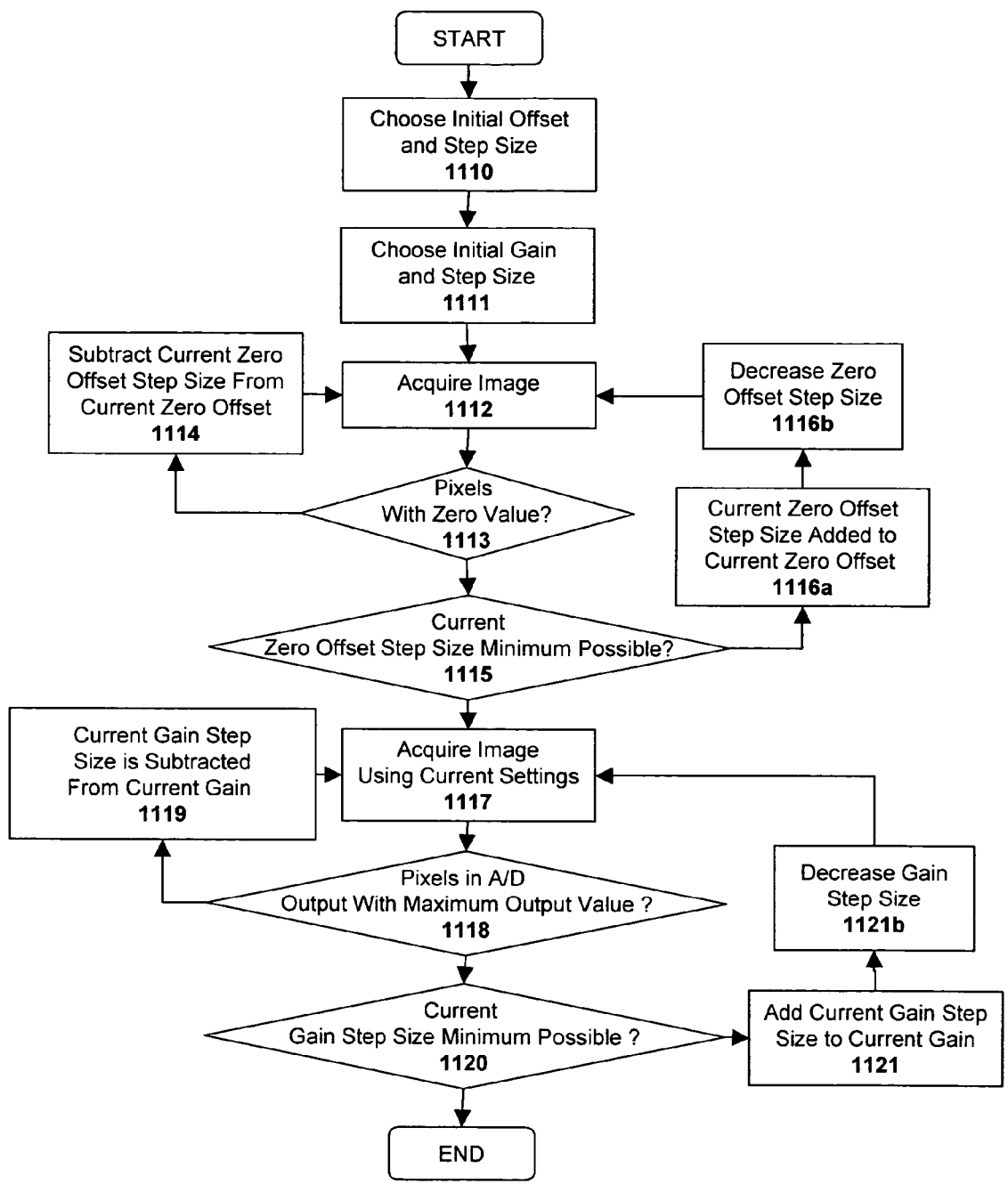
FIG. 11b illustrates a process for selecting zero offset and gain in accordance with one embodiment of the invention.
Figure 12:
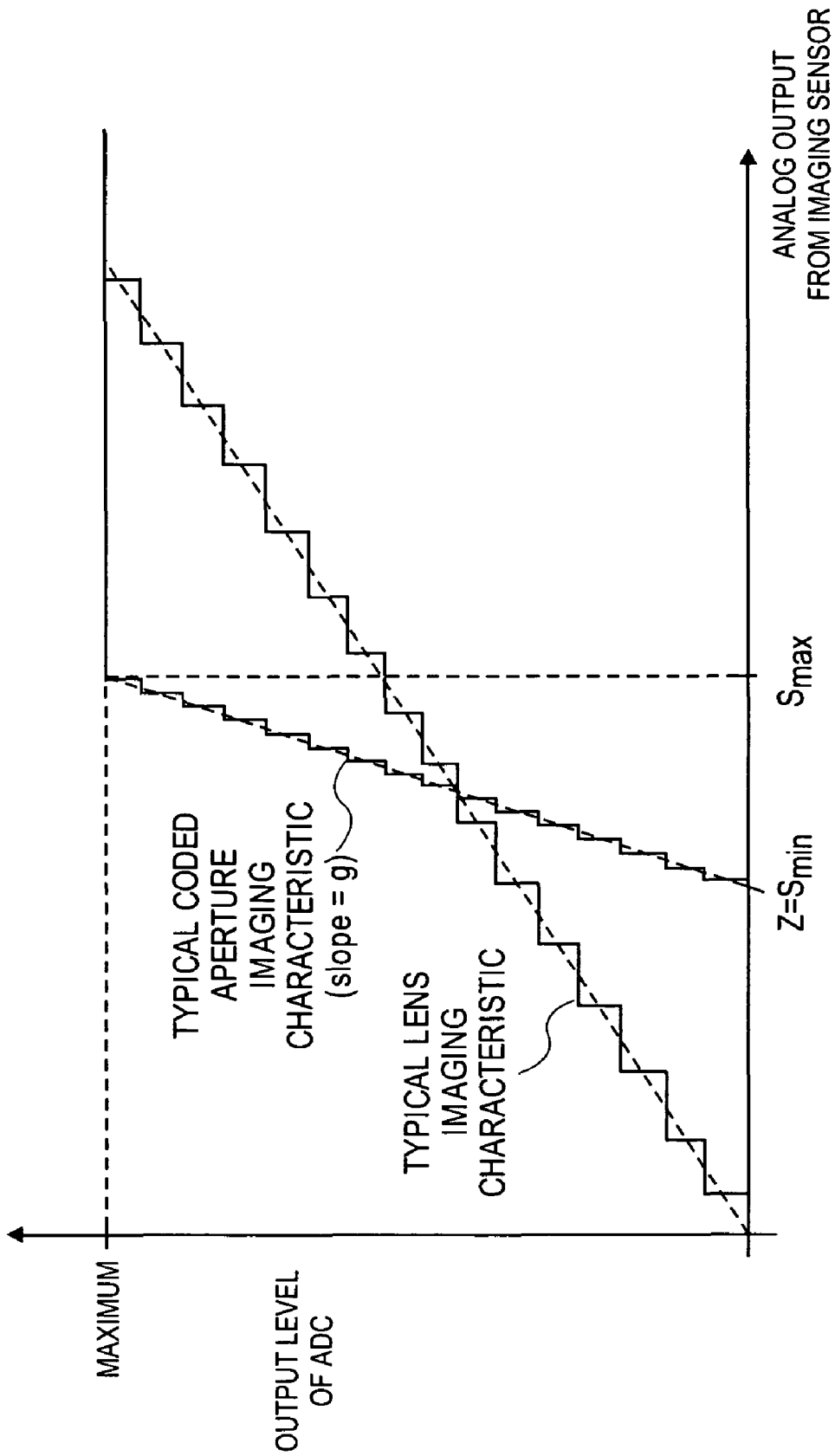
FIG. 12 illustrates a coded aperture characteristic and a lens characteristic.

FIG. 12 depicts the characteristic of the resulting system. Note that as described above, the dynamic range of the scene is compressed by coded aperture imaging; therefore, zero offset and gain will typically be much higher than in lens imaging. In one embodiment, zero offset and gain are automatically chosen in an optimal fashion by the coded aperture camera according to the following set of operations, illustrated in the flowchart in FIG. 11b:

At 1110, an initial zero offset is selected as the maximum possible zero offset and a relatively large initial step size is selected for the zero offset. At 1111 an initial gain is selected as the maximum possible gain and a relatively large initial step size is selected for the gain.

At 1112, an image is acquired using the current settings and a determination is made at 1113 as to whether there are any pixels in the A/D output with a zero value. If there are pixels with a zero value, then the current zero offset step size is subtracted from the current zero offset at 1114 and the process returns to 1112.

Otherwise, if there are no pixels with a zero value, a check is made at 1115 as to whether the current zero offset step size is the minimum possible step size. If this is not the case, then at 1116a, the current zero offset step size is added to the current zero offset, making sure that the maximum possible zero offset is not exceeded. The current zero offset step size is then decreased at 1116b (e.g., by dividing it by 10) and the process returns to 1112.

Otherwise, at step 1117, an image is acquired using the current settings. At 1118, a determination is made as to whether there are any pixels in the A/D output with the maximum output value (e.g. 255 for an 8-bit A/D). If there are pixels with the maximum value, then the current gain step size is subtracted from the current gain at 1119 and the process returns to 1117.

Otherwise, at 1120, a determination is made as to whether the current gain step size is the minimum possible step size. If this is not the case, then at 1121a, the current gain step size is added to the current gain, making sure the maximum possible gain is not exceeded. The current gain step size is then decreased at 1121b (e.g., by dividing it by 10) and the process returns to 1117. Otherwise, the process ends with the current zero offset and gain settings.

Before applying the reconstruction algorithm, the effects of zero offset and gain have to be reversed. In one embodiment, this is done by digitally computing the corrected sensor signal s* from the A/D output signal s" whereas s" is the output of the A/D pertaining to the A/D input signal s' and s*=s"/g+z. Note that in the absence of noise in the op amp 1100 and in the absence of quantization errors, s* would equal the original analog sensor output signal s.

Figure 13:
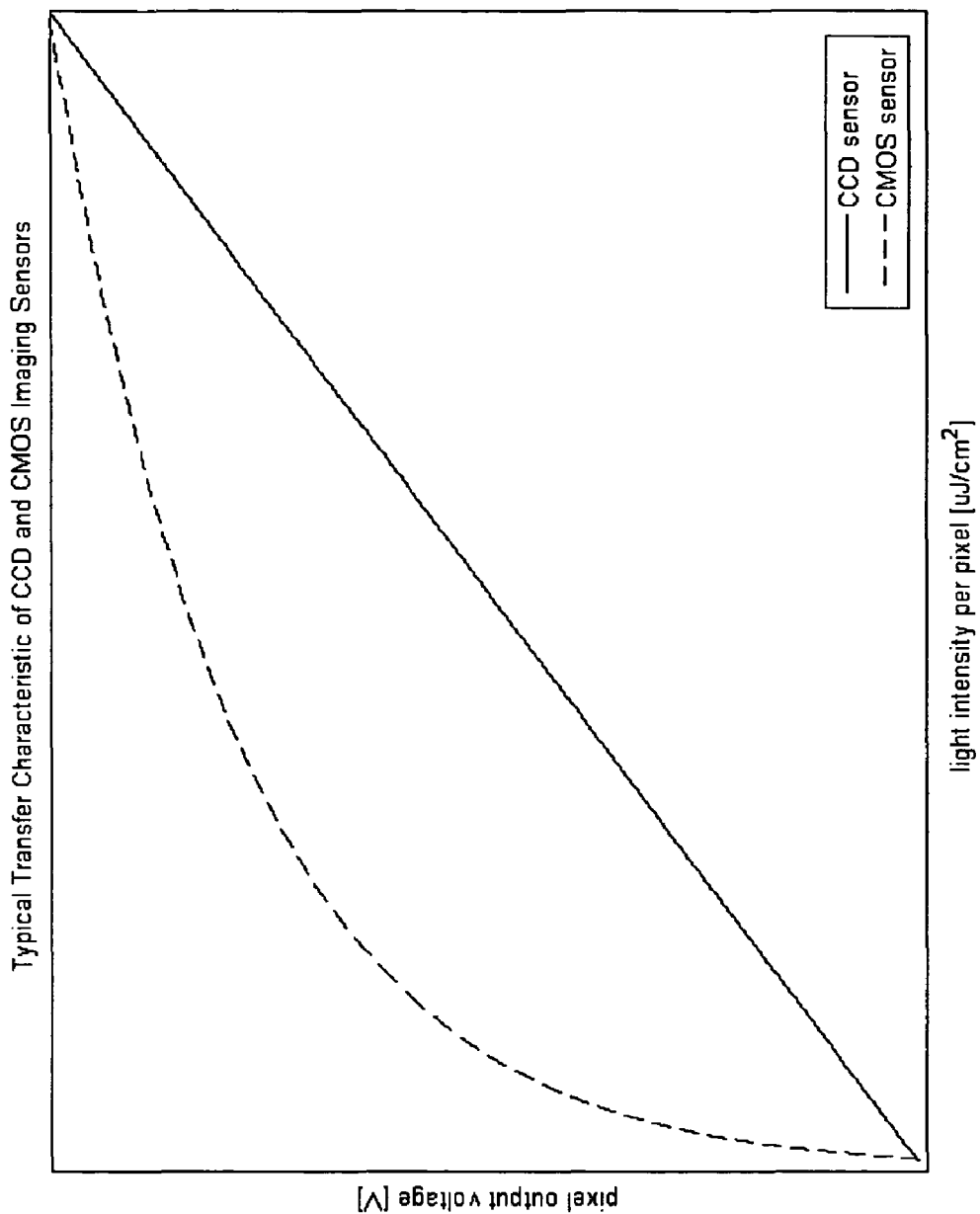
FIG. 13 illustrates a graph showing typical CMOS and CCD image sensor transfer characteristics.

In coded aperture imaging, each sensor pixel is exposed to light emitted by different pixels of the scene, reaching the sensor pixel through different open aperture elements. The reconstruction algorithms used in coded aperture imaging assume that the output signal of each sensor pixel is the sum of all output signals of the sensor pixel when only exposed to only a single scene pixel. Therefore, in one embodiment, the sensor output signal s is an exactly linear function of the number p of photons hitting each sensor pixel during the exposure time. The function describing the dependency of the sensor output signal from the actual photon count of each sensor pixel is called the "transfer characteristic" of the sensor. CCD imaging sensors have a linear transfer characteristic over a large range of intensities while CMOS imaging sensors have a logarithmic transfer characteristic. A graph showing typical CMOS and CCD image sensor transfer characteristics is shown in FIG. 13. When the transfer characteristic s=f(p) of the sensor is known, it can be compensated for by means of a lookup table. That is, instead of using the value s* for the reconstruction, the value LUT (s*)=LUT (s"/g+z) is used where LUT is a lookup table compensating for any non-linear effects in the sensor transfer characteristic. Once the operations above have been completed, the adjusted sensor image is stored in the memory of the DSP, ASIC or other type of image reconstruction processor 130 of the camera in preparation for image reconstruction.

The captured image may bear no resemblance to the scene image. FIG. 14 shows examples of flat scenes (i.e. scenes with no depth) and the adjusted sensor images that result from them. Image 1401 is a 2-dimensional test pattern, whereas images 1402 and 1403 are photographs of real-world 3-dimensional scenes with depth. Images 1402 and 1403 were photographed with a conventional lens camera, and then the resulting captured 2-dimensional images were used in the example. Sensor images 1411, 1412 and 1413 are the sensor images corresponding to scenes 1401, 1402 and 1403, respectively, projected through a 307×307 element MURA aperture.

It should be noted that in coded aperture photography, the dynamic range of the sensor signal is different from the dynamic range of the imaged scene. Since each sensor pixel is exposed to a large number of scene pixels across the entire field-of-view, the coded aperture has an averaging effect on the range of intensities. Even scenes with a very high dynamic range (e.g. dark foreground objects and bright background objects) produce sensor signals with a low dynamic range. In the process of image reconstruction, the dynamic range of the original scene is reconstructed independently of the dynamic range of the imaging sensor. Rather, the limited dynamic range of the imaging sensor (finite number of bits for quantization) leads to quantization errors which can be modeled as noise in the sensor image. This quantization noise also causes noise in the reconstruction. The noise is more prominent close to the edges of the reconstructed image as described above, since in these areas a high multiplier must be applied for compensating for collimator attenuation and photometric attenuation. As a result, imaging a scene with high dynamic intensity range with an imaging sensor with low dynamic range causes the reconstructed image to be more noisy, but not to have lower dynamic range. This is in contrast to lens photography where the dynamic range of the imaging sensor directly limits the maximum dynamic range of the scene which can be imaged.

Figure 15:
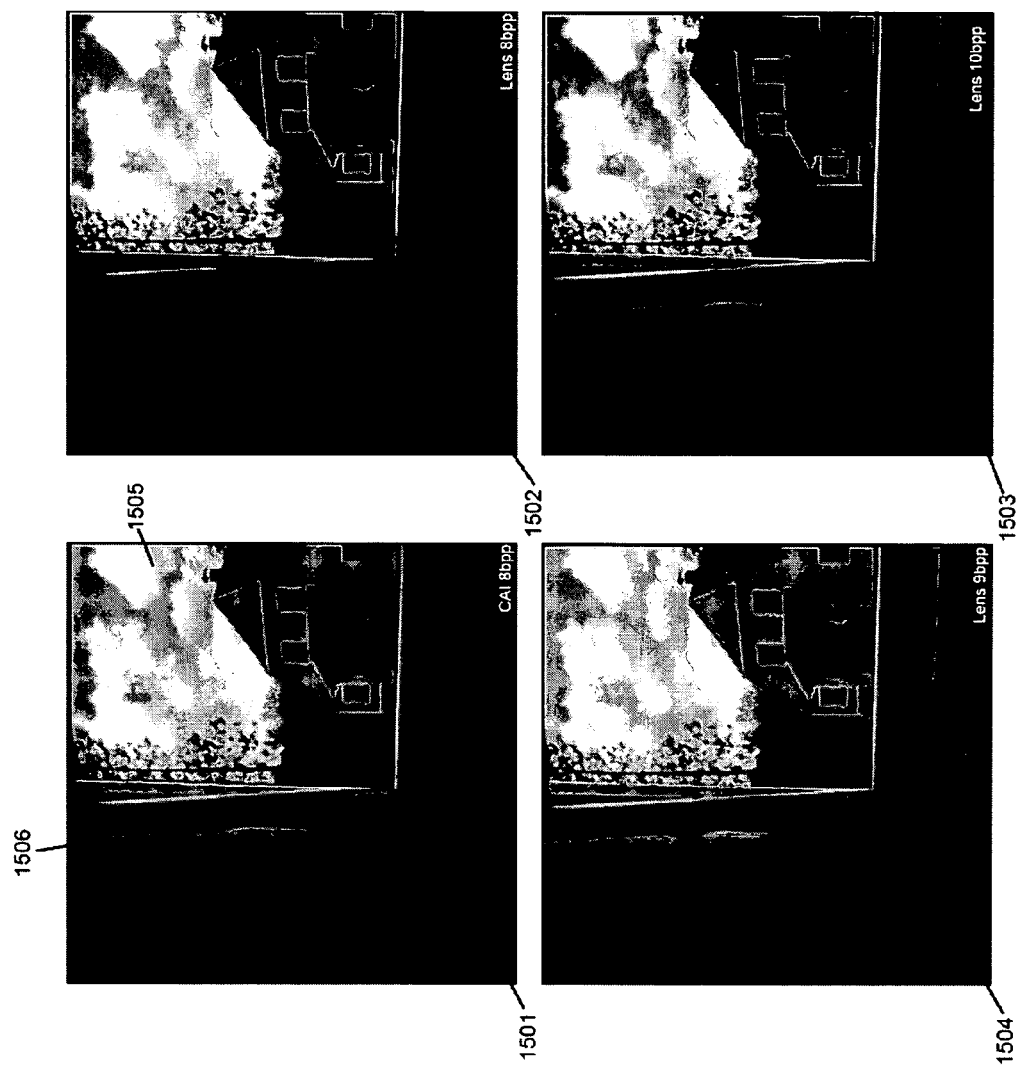
FIG. 15 illustrates four monochromatic images, some of which are generated in accordance with the underlying principles of the invention.

For example, consider the 4 monochromatic images 1501-1504 shown in FIG. 15. Each image is 477×477 pixels. All four images show the same scene. Part of the scene 1505 (i.e. the entire portion of the scene visible through the window) shows a house and sky through a window in daylight and part of the scene 1506 (i.e. the entire portion of the scene that is not visible through the window) shows the inside of the window. Portion 1506 was illuminated with a much lower level of illumination than portion 1505, and had conventional photographic film been used, it would have appeared entirely black.

Image 1501 shows a reconstruction of the scene after it has been projected through a 477×477 element MURA aperture onto an image sensor with 8 bits per pixel (bpp) of gray scale resolution and reconstructed using the coded aperture imaging techniques described herein. Image 1502 shows the image projected through a conventional glass lens onto an image sensor with 8 bpp of gray scale resolution. Image 1503 shows the image projected through a conventional glass lens onto an image sensor with 9 bpp of gray scale resolution. Image 1504 shows the image projected through a conventional glass lens onto an image sensor with 10 bpp of gray scale resolution.

Adobe Photoshop (of Adobe Systems, Inc. of San Jose, Calif.) was used to retouch the portion 1506 inside the window of each image 1501-1504. Portion 1506 was brightened (an equal amount with each image) so that the details of the window frame would be visible (without the brightening, this portion would have appeared almost completely black). This is a common technique used by photographers when portions of a digital photograph are too dark to be seen. Also, with image 1501, the left and bottom edges which are nearly black were smoothed with a gaussian filter to reduce noise.

Note that all images 1501-1504 provide a good reproduction of the portion 1505 of the scene that is outside the window. However, the portion 1506 of the scene that is inside the window looks quite different in each image 1501-1504. Consider, for example, the window latch on the left side of the window. In the Lens 8 bpp image 1502, the latch is lost entirely, and the left side of the window is represented by nothing but unsightly solid gray contours. In the Lens 9 bpp image 1503, a rough shape of the latch begins to be visible and there are a few more levels of gray, but it still is not a good representation of the window latch and left side of the window. In the Lens 10 bpp image 1504, the window latch is finally reasonably distinct. Although there are still unsightly gray contours on the window frame, further retouching in Adobe Photoshop could probably smooth them out to an acceptable quality level since the features of the inside of the window are preserved (in the 8 bpp and 9 bpp images 1502 and 1503, the features are lost and can not be recovered through retouching). In the CAI 8 bpp image 1501, the window latch is quite reasonably represented and there are no gray contours. The window latch and window frame do suffer from more noise than they do in the Lens images 1502-1504, but this may be smoothed out with further retouching since the features of the inside of the window were preserved. While it may be argued whether the quality of the portion of the scene 1506 inside the window in either CAI 8 bpp image 1501 or Lens 10 bpp image 1504 is better in one image than the other, there is no question that the portion of the scene 1506 of CAI 8 bpp image 1501 is of better quality than that of both the Lens 8 bpp image 1502 and the Lens 9 bpp image 1503. Thus it can be seen that, for a given gray scale depth image sensor, a digital camera incorporating the CAI techniques described herein can reproduce a wider dynamic range scene than a conventional glass lens-based digital camera.

Scene Reconstruction

The following set of operations are used in one embodiment of the invention to reconstruct scenes from sensor images that are captured and adjusted as described above. According to Gottesman, a MURA aperture array is constructed in the following way. First consider a Legendre sequence of length p where p is an odd prime. The Legendre sequence l (i) where i=0, 1, . . . , p−1 is defined as:

$l(0)=0$, $l(i)=+1$ if for any $k=1, 2, \ldots, p-1$ the relation $k^2$ mod $p=l$ is satisfied $l(i)=-1$ otherwise.

Then the MURA a (i, j) of size p×p is given by:

$a(0, j)=0$ for $j=0, 1, \ldots, p-1$, $a(i, 0)=1$ for $i=1, 2, \ldots, p-1$, $a(i, j)=(l(i)*l(j)+1)/2$ for $i=1, 2, \ldots, p-1$ and $j=1, 2, \ldots, p-1$.

In this MURA array, a 1 represents an transparent aperture element and a 0 represents an opaque element. The number of transparent elements in a single period of this MURA is $K=(p^2-1)/2$. The periodic inverse filter g (i, j) pertaining to this MURA is given by:

$g(0, 0)=+1/K$, $g(i, j)=(2a(i, j)-1)/K$ if $i>0$ or $j>0$.

It can be shown that the periodic cross-correlation function phi (n, m) between a (i, j) and g (i, j) is 1 for n=0 and m=0, and 0 otherwise. The periodic inverse filter pertaining to a MURA therefore has the same structure as the MURA itself, except for a constant offset and constant scaling factor, and for the exception of a single element which is inverted with respect to the original MURA. FIG. 4, described previously, shows various sizes of MURA apertures.

When an object at a constant distance is imaged with a coded aperture, the sensor image is given by the periodic cross-correlation function of the object function with the aperture array, magnified by a geometric magnification factor f as described above. For reconstructing the original object, the periodic cross-correlation function of the measured sensor image with an appropriately magnified version of the periodic inverse filter is computed. In the absence of noise and other inaccuracies of the measured sensor image, the result equals the original object function.

One advantage of using MURAs as aperture arrays that the periodic inverse filter g, with the exception of a single row and a single column, can be represented as the product of two one-dimensional functions, one being only a function of the row index and the other one being only a function of the column index. Therefore, the computation of the periodic cross-correlation of the sensor image with the periodic inverse filter g can essentially be decomposed into two one-dimensional filtering operations making it less computationally complex. It should be noted that computation of a two-dimensional filtering operation requires $O(p^4)$ multiply-add-accumulate (MAC) operations. Two one-dimensional filter operations, on the other hand, require $O(p^3)$ operations. Filtering a single column or a single row requires $O(p^2)$ MAC operations. When this is performed for each of p columns and for each of p row, $2p^3$ MAC operations result which is $O(p^3)$.

Further, it is known that a one dimensional, periodic filter operation can preferably be computed in the FFT (Fast Fourier Transform) domain. The complexity of an FFT or inverse FFT of length p is known to have the computational complexity $O(p \log p)$. In the FFT domain, the filtering requires only p multiplications. Therefore, the complexity of transforming a single column or a single row into the FFT domain, performing a periodic filter operation in the FFT domain, and transforming the result back has the computational complexity $O(p \log p)$. Performing this operation per row and per column yields an overall complexity of $O(p^2 \log p)$ which for large image sizes is a significant reduction with respect to the original $O(p^4)$.

Performing the inverse filtering then consists of the following set of operations:

1. For each row of the sensor image, compute the complex conjugate of its one-dimensional FFT.

2. For each row in the FFT domain, perform a sample-by-sample multiplication of the result of (1). with the known FFT of the Legendre Sequence 3. For each row, compute the one-dimensional inverse FFT of the result of (2). Assemble all rows of the results back into a two-dimensional image.

4. For each column of the resulting image, compute the complex conjugate of its one-dimensional FFT.

5. For each column in the FFT domain, perform a sample-by-sample multiplication of the result (4) with the known FFT of the Legendre Sequence l (i).

6. For each column, compute the one-dimensional inverse FFT of the of the result of (5). Assemble all columns back into a two-dimensional image.

7. For each column of the sensor image, compute the sum of its pixel values. Rearrange the resulting column-sum vector in such a way that the sequence of column indices is 0, p-1, p-2, p-3, . . . 3, 2, 1. Subtract the resulting vector of column-sums from each row of the result of (6).

8. For each row of the sensor image, compute the sum of its pixel values. Rearrange the resulting row-sum vector in such a way that the sequence of row indices is 0, p-1, p-2, p-3, . . . 3, 2, 1. Add the resulting vector of row-sums to each column of the result of (7).

9. Rearrange both the column-indices and the row-indices of the sensor image as described in (7) and (8), yielding a mirrored version of the sensor image. Add this mirrored version of the sensor image to the result of (8).

10. Finally, divide each pixel of the result of (9) by K, the number of transparent aperture elements in a single period of the MURA.

Note that the above operations (1) to (6) implement the periodic cross-correlation of the sensor image with the product of two Legendre sequences (one column-wise and one row-wise). Operations (7) and (9) implement the corrections to the result which result from the fact that the first row as well as the first column of the MURA and its periodic inverse filter differ from the product of two Legendre sequences.

Reconstruction of a Scene with One Object at a Known Range

As mentioned above, in one embodiment, reconstruction of the scene from the sensor signal is performed in a digital signal processor ("DSP") (e.g., DSP 132) integrated into the camera or in a computing device external to the camera. In one embodiment, scene reconstruction consists of the following sequence of operations:

1. linearize the transfer characteristic of the output signal of the sensor such that the linearized output signal of each sensor pixel is proportional to the number of photons counted by the sensor pixel.

2. Resample the sensor signal by means of re-binning or interpolation onto a new grid such that each pixel of the resampled sensor signal has the size of an aperture element, magnified with the magnification factor $f=(o+a)/o$ where o is the expected distance between an object to be imaged and the aperture and a is the distance between the aperture and the sensor.

3. If the resampled sensor signal has more pixels than the aperture array, then cut out the central part of the resampled sensor signal such that it has the same number of pixels as the aperture array.

4. Periodically cross-correlate the resampled sensor signal with the periodic inverse filter pertaining to the aperture array.

5. Clip the result to non-negative pixel values.

6. Compensate for collimator attenuation and photometric attenuation by multiplying each pixel with an appropriate amplification factor.

7. Optionally smooth the off-axis parts of the result which are more subject to noise amplification during (6) than the center part of the result.

It should be noted that if the aperture array is a MURA, the inverse filtering of operation (4) can be decomposed into a sequence of two one-dimensional filter operations, one of which is applied per image row and the other of which is applied per image column. This decomposition substantially reduces the computational complexity of (4).

Figure 16:
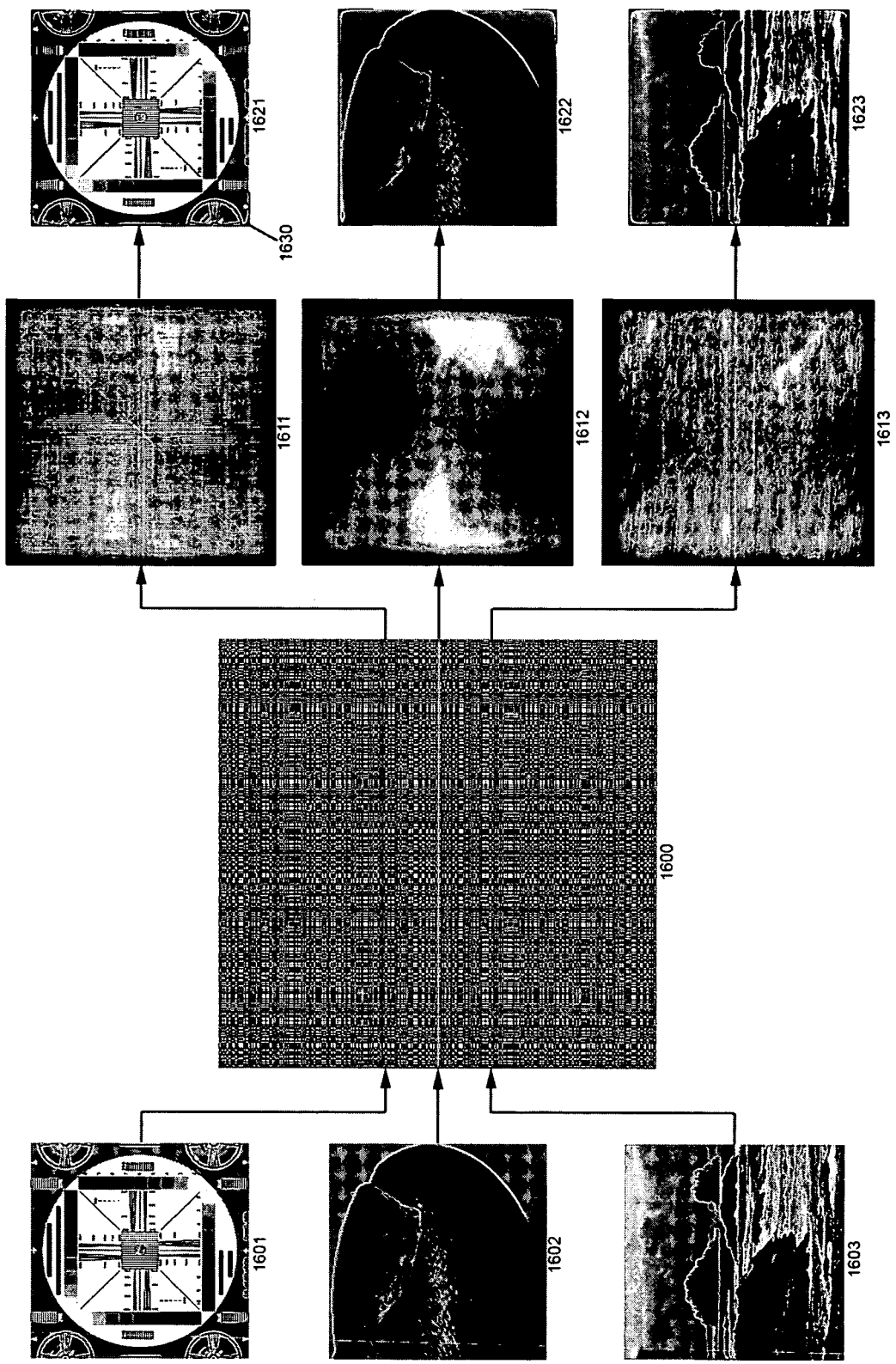
FIG. 16 illustrates three examples of a projection and reconstruction of three flat scenes at a known range.

FIG. 16 illustrates three examples of the projection and reconstruction of three flat scenes at a known range using the procedure described in the preceding paragraph. Scene 1601 is a flat (2-dimensional) test pattern of 307×307 pixels. It is projected through a 307×307 element MURA aperture 1600 onto an image sensor (e.g., sensor 106), resulting in the sensor image 1611. Sensor image 1611 is adjusted and reconstructed per the process described above resulting in reconstruction 1621. Note that the extreme corners 1630 of reconstruction 1621 are not accurately reconstructed. This is due to the attenuation of light during the projection through the aperture at the extreme edges of the image. In the same manner, flat 307×307 pixel image 1602 is projected through MURA 1600 resulting in sensor image 1612 and is processed to result in reconstruction 1622. In the same manner, flat 307×307 pixel image 1603 is projected through MURA 1600 resulting in sensor image 1613 and is processed to result in reconstruction 1633.

It is noted that, as described above and illustrated in FIG. 15, sensor images 1611-1613 may be quantized at a given number of bits per pixel (e.g. 8), but may yield in the reconstructed images 1621-1623 an image with a useful dynamic range comparable to a higher number of bits per pixel (e.g. 10).

Reconstruction of a Scene with One Object at an Unknown Range

In one embodiment, operations (2) through (7) of the sequence of operations described above are repeated for different expected object ranges o, when the true object range is uncertain or unknown. By this technique a set of multiple reconstructions is obtained from the same sensor signal. Within this set of reconstructions, the one where the expected object range is identical with or closest to the true object range will be the most accurate reconstruction of the real scene, while those reconstructions with a mismatch between expected and true range will contain artifacts. These artifacts will be visible in the reconstruction as high-frequency artifacts, such as patterns of horizontal or vertical lines or ringing artifacts in the neighborhood of edges within the reconstruction.

According to one embodiment of the present invention, among this set of reconstructions, the one with the least artifacts is manually or automatically selected. This allows a change in the range of reconstruction without the need to pre-focus the camera and, in particular, without the need to mechanically move parts of the camera, as would be required with a lens camera, or to pre-select an expected object range. Further, this allows the user to decide about the desired range of reconstruction after the image acquisition (i.e. retrospectively). Preferably, the range of reconstruction is automatically selected from the set of reconstructions by identifying the reconstruction with the least amount of high-frequency artifacts and the smoothest intensity profile.

A simple, but highly effective criterion for "focusing" a coded aperture camera, i.e., for determining the correct range from a set of reconstructions, is to compute the mean m and the standard deviation $\sigma$ of all gray level values of each reconstruction. Further, the ratio $m/\sigma$ is computed for each reconstruction. The reconstruction for which this ratio takes on its maximum is chosen as the optimal reconstruction, i.e., as the reconstruction which is "in focus."

This is illustrated in FIGS. 17a-b where the test image 1601 from FIG. 16 was imaged at a range of 1,000 mm. Reconstructions were computed from the resulting sensor image at assumed ranges of 100 mm (image 1701), 500 mm (image 1702), 900 mm (image 1703), 1,000 mm (image 1704), 1,100 mm (image 1705), 2,000 mm (image 1706) and infinity (image 1707). In the figure, it can clearly be seen that the reconstruction 1704 at the correct range of 1,000 mm looks "clean" while the reconstructions at different ranges contain artifacts. The more the assumed range differs from the true range of the test image 1601, the stronger the artifacts. FIG. 15 also shows the quotient (m/s) of the gray value mean, divided by the gray value standard deviation, for each reconstruction. This value starts at 1.32 at an assumed range of 100 mm, and then continuously increases to a maximum of 2.00 at the correct range of 1,000 mm, then continuously decreases again to a value of 1.65 at an assumed range of infinity. The example shows how the true range of the scene can be easily computed from a set of reconstructions by choosing the reconstruction at which the quotient m/s takes on its maximum.

Optimization of Reconstruction of a Scene with One Object at an Unknown Range According to one embodiment, only a partial reconstruction of parts of the image is computed using different expected object ranges o. A partial reconstruction is computed by only evaluating the periodic cross-correlation function in operation (4) above for a subset of all pixels of the reconstructed image, thus reducing the computational complexity of the reconstruction. This subset of pixels may be a sub-sampled version of the image, a contiguous region of the image, or other suitable subsets of pixels. In one embodiment, when the aperture array is a MURA, the subset is chosen as a rectangular region of the reconstructed image, including the special cases where the rectangular region is a single row or a single column of the reconstructed image or a stripe of contiguous rows or columns of the reconstructed image. Then, the two one-dimensional periodic filtering operations only need to be evaluated for a subset of rows and/or columns of the reconstructed image. From the set of partial reconstructions, the one with the least amount of high-frequency artifacts and the smoothest intensity profile is identified in order to determine the true object range o. For the identified true object range o, a full reconstruction is then performed. This way, the computational complexity of reconstructing the scene while automatically determining the true object range o can be reduced.

Reconstruction of a Scene with Multiple Objects at Unknown Ranges

According to one embodiment, a set of full image reconstructions at different object ranges o is computed. Since objects in different parts of the scene may be at different ranges, the reconstructions are decomposed into several regions. For each region, the object range o which yields the least amount of high-frequency artifacts and the smoothest intensity profile is identified. The final reconstruction is then assembled region by region whereas for each region the reconstruction with the optimum object range o is selected. This way, images with infinite depth of field-of-view (from close-up to infinity) can be reconstructed from a single sensor signal.

FIGS. 18a-b illustrates an example of this improved reconstruction method. The test image (source image 1601 shown in FIG. 16) was imaged in such a way that its left half was at a range of 1,000 mm from the coded aperture camera while its right half was at a range of 1,500 mm. FIG. 18 image 1801L/1801R is a "flat" reconstruction of the entire image at an assumed range of 1,000 mm. Note that left half 1801L exhibits fewer artifacts than right half 1801R, but both halves are of very poor quality. Image 1802L/1802R is a flat reconstruction of the entire image at assumed range of 1,500 mm. In this case the right half 1802R exhibits fewer artifacts than left half 1802L, but both halves are of very poor quality. Image 1803L/1803R shows a combined flat reconstruction in which 1803L takes the left half 1801L of the 1801L/1801R reconstruction and 1803R takes the right half 1802R of the 1802L/1802R reconstruction. Although this combined image exhibits fewer artifacts than either 1801L/1801R or 1802L/1802R reconstructions, the result still is of very poor quality.

This example demonstrates that the combined reconstruction is of lower quality than a flat reconstruction of a flat scene, i.e., of a scene with only a single object at a single range. The presence of other regions in the scene which are "out of focus" do not only cause the out-of-focus regions to be of inferior quality in the reconstruction, but also cause the in-focus region to contain artifacts in the reconstruction. In other words, there is a "crosstalk" between the out-of-focus and the in-focus regions. This crosstalk and techniques for suppressing it are addressed in the following.

Reduction of "Crosstalk" in Reconstructing a Scene with Multiple Objects at Unknown Ranges As explained before, the "flat" reconstruction of a region $r_1$ at range $o_1$ would only be accurate if the entire scene were at a constant range $o_1$. If, however, other regions are at different ranges, there will be "crosstalk" affecting the reconstruction of region $r_1$. Therefore, according to one embodiment, an iterative reconstruction procedure is employed which eliminates this crosstalk among different regions in the scene at different ranges. The iterative reconstruction procedure according to one embodiment of the invention consists of the following set of operations.

1. Computing a "flat" reconstruction, i.e., a reconstruction assuming a homogeneous range across the entire scene, at a set of ranges $o_1, o_2, \ldots, o_n$.

2. Using the flat reconstructions obtained this way to decompose the scene into a number of contiguous regions $r_1, r_2, \ldots, r_m$ and corresponding ranges $o_1, o_2, \ldots, o_m$. The decomposition is done in such a way that for each region its reconstruction $r_i$ at range $o_i$ is "better", i.e., contains less high-frequency artifacts and has a smoother intensity profile, than all reconstructions of the same region at other ranges.

3. For each of the reconstructed regions $r_i$ (i=1, 2, ..., m) computing its contribution $s_i$ to the sensor image. This is done by computing the two-dimensional, periodic cross-correlation function of $r_i$ with the aperture function. Note that if the reconstructions of all the regions were perfect, then the sum of all sensor image contributions would equal the measured sensor image s.

4. For each of the reconstructed regions $r_i$ (i=1, 2, ..., m) subtracting the sensor image contributions of all other regions from the measured sensor image, i.e., $$\Delta s_i = s - \sum_{k \neq i} s_k.$$

Note that each $\Delta s_i$ (i=1, 2, ..., m) now contains a sensor image pertaining only to region $r_i$, the contributions of all other regions $r_j$, $j \neq i$, being mostly suppressed. Due to the fact that the reconstruction of the other regions will not be perfect but contain reconstruction errors, there will be some remaining crosstalk, i.e. the $\Delta s_i$ will contain some residual contributions from the other regions. However, this crosstalk is much lower than the crosstalk without computation of a difference sensor image.

5. Utilizing the $\Delta s_i$ (i=1, 2, ..., m) to compute a refined reconstruction $r'_i$ for each region at range $o_i$. Optionally, this step can be repeated with a number of different ranges around the initial range $o_j$ in order to also refine the range estimate $o_i$. In this case, for each region the reconstruction and range with the least high-frequency artifacts and the smoothest intensity profile are selected.

6. Optionally, going back to operation (3) for an additional refinement of each region.

FIGS. 18a-b Image 1804L/1804R shows the reconstruction of the same example as in the remainder of FIG. 18a-b, but employs the improved reconstruction algorithm with crosstalk reduction. In operation (1) (flat reconstruction), a range of 1,200 mm was assumed. Afterwards, a single crosstalk reduction (operations (2) to (5)) was performed whereas ranges of 1,000 mm and 1,500 mm were assumed for the left and right halves of the image, respectively. It can be seen from the example that the crosstalk reduction strongly improves the quality of the reconstruction of a scene with objects at different ranges.

Determination of Range of Objects within a Reconstructed Scene

According to one embodiment, the output signal of the coded aperture camera (in addition to the two-dimensional image information) also contains range information for each image pixel or for several image regions, as determined from finding the object range o for each region with the least amount of high-frequency artifacts and the smoothest intensity profile. Thus, for every pixel reconstructed in the image, in addition to the reconstruction deriving a single intensity value (for grayscale visible light, infrared, ultraviolet or other single frequency radiation) or three intensity values for visible red, green, blue color light, the reconstruction assigns a z value indicating the distance from the camera to the object at that pixel position in the image. This way, three-dimensional image data can be obtained from a single, two-dimensional sensor signal. Further, the range data allows the camera, an external imaging manipulation system, or the user, utilizing an image manipulation application or system to easily segment the two-dimensional image into different regions pertaining to different parts of the scene, such as separating objects in the foreground of a scene from the background of a scene.

By way of example, FIG. 19 shows a person 1901 standing close to the camera, while mountains 1902 are far behind the person 1901. In this example, the reconstruction operation assigns a smaller z value to the pixels representing the person 1901 and a larger z value to the pixels representing the mountains 1902.

Using Range Information to Eliminate the Need for Blue/Green Screens

Chroma-keying is a technique commonly used in video and photographic production to separate a foreground image from a solid background color. Typically, a "blue screen" or "green screen" is used, which is a very carefully colored and illuminated screen that is placed behind a performer or object while the scene is photographed or captured on video or film. Either in real-time or through post-processing, a hardware or software system separates the presumably distinctively colored foreground image from the fairly uniformly colored background image, so that the foreground image can be composited into a different scene. For example, typically the weatherperson on a TV news show is chroma-keyed against a blue or green screen, then composited on top of a weather map.

Such blue or green screens are quite inconvenient for production. They are large and bulky, they require careful illumination and must be kept very clean, and they must be placed far enough behind the foreground object so as not to create "backwash" of blue or green light onto the edges of the foreground object. Utilizing the principles of the embodiment of the previous paragraph, an image can be captured without a blue or green screen, and the z value provided with each pixel will provide a compositing system with enough information to separate a foreground object from its background (i.e., by identifying which pixels in the scene contain the image of closer objects and should be preserved in the final image, and which pixels in the scene contain the image of further away objects and should be removed from the final image). This would be of substantial benefit in many applications, including photographic, video, and motion picture production, as well as consumer applications (e.g. separating family members in various pictures from the background of each picture so they may be composited into a group picture with several family members).

Figure 20:
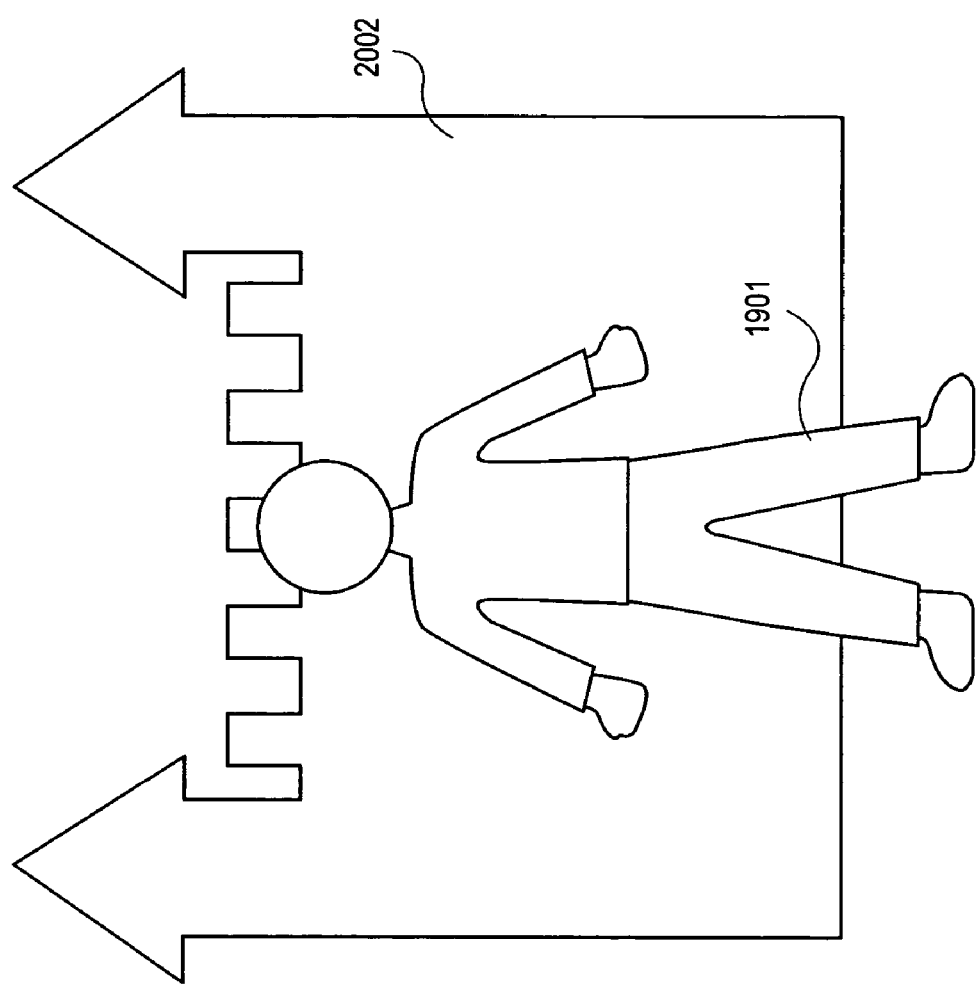
FIG. 20 illustrates how the person from FIG. 19 can readily be placed in a scene with a different background.

FIG. 20 shows how a person 1901 from FIG. 19 can readily be placed in a scene with a different background, such as the castle 2002 with the background mountains 2002 removed from the picture. This is simply accomplished by replacing every pixel in the image reconstructed from FIG. 19 that has a z value greater than that of person 1901 with a pixel from the image of the castle 2002. Once again, the processing of z values may be implemented using virtually any type of image processor including, for example, a DSP, ASIC or a general purpose processor.

Using Range Information to Improve Optical Motion Capture Systems

The per-pixel distance ranging capability of one embodiment also has applications in optical performance motion capture ("mocap"). Mocap is currently used to capture the motion of humans, animals and props for computer-generated animation, including video games (e.g. NBA Live 2005 from Electronic Arts of Redwood City, Calif.), and motion pictures (e.g. "The Polar Express", released by the Castle Rock Entertainment, a division of Time Warner, Inc, New York, N.Y.). Such mocap systems (e.g. those manufactured by Vicon Motion Systems, Ltd. of Oxford, United Kingdom) typically utilize a number of glass lens video cameras surrounding a performance stage. Retroreflective markers (or other distinctive markings) are placed all over the bodies of performers and upon props. The video cameras simultaneously capture images of the markers, each capturing the markers within its field of view that is not obstructed. Finally, software analyzes all of the video frames and by triangulation, tries to identify the position of each marker in 3D space.

Figure 21:
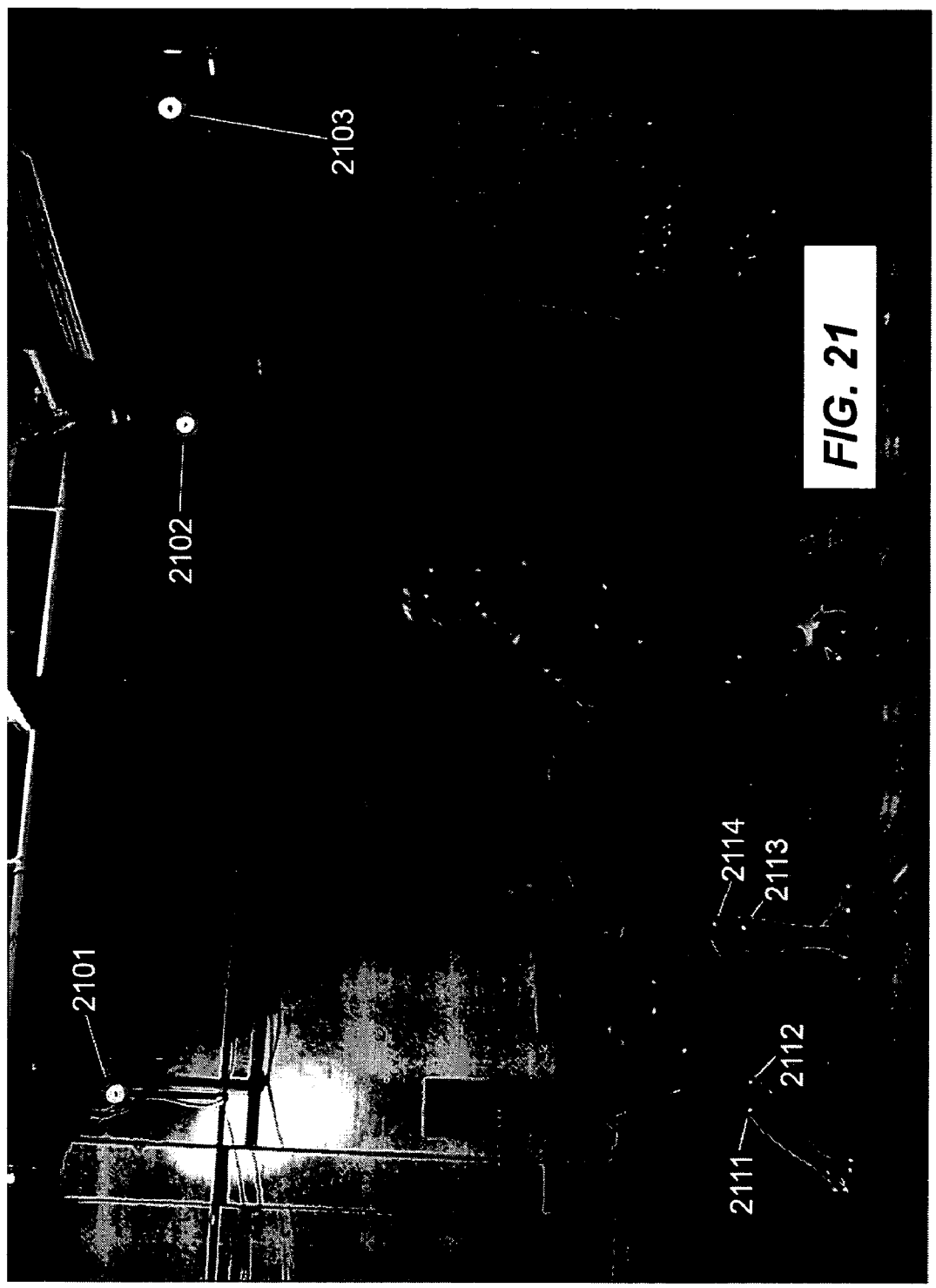
FIG. 21 illustrates a photograph of an exemplary motion capture session.

FIG. 21 is a photograph of an exemplary motion capture session. The three bright rings of light are rings of LEDs around the lenses of the video cameras 2101-2103. The performers are wearing tight-fitting black suits. The gray dots on the suits are retroreflective markers that reflect the red LED light back to the camera lenses causing the markers to stand out brightly relative to the surrounding environment. Four such retroreflective markers on the knees of the left performer are identified as 2111-2114.

Because all of the markers look the same in a camera image, one of the challenges faced by mocap systems is determining which marker image corresponds to which marker (or markers) in the scene, and then tracking them frame-to-frame as the performers or props move. Typically, the performer stands roughly in a known position, with the markers placed in roughly known positions on the performer's body (or on a prop). The cameras all capture an initial frame, and the software is able to identify each marker because of the approximately known position of the performer and the markers on the performer. As the performer moves, the markers move in and out of the fields of view of the cameras, and often become obscured from the one, several or even all cameras as the performer moves around. This creates ambiguities in the mocap system's ability to continue to identify and track the markers.

For example, if a frame of a given video camera shows a marker centered at a given (x, y) pixel position, it is quite possible that the image is really showing two markers lined up one behind the other, leaving one completely obscured. In the next frame, the performer's motion may separate the markers to different (x, y) positions, but it can be difficult to determine which marker was the one in front and which was the one in back in the previous frame (e.g. the marker further away may appear slightly smaller, but the size difference may be less than the resolution of the camera can resolve). As another example, a performer may roll on the floor, obscuring all of the markers on one side. When the performer stands up, many markers suddenly appear in a camera's image and it may be difficult to identify which marker is which. A number of algorithms have been developed to improve this marker identification process, but it is still the case that in a typical motion capture session, human operators must "clean up" the captured data by manually correcting erroneous marker identification, frame-by-frame. Such work is tedious, time-consuming and adds to the cost of mocap production.

In one embodiment of the invention, glass lens video cameras are replaced by video cameras utilizing coded aperture techniques described herein. The coded aperture cameras not only capture images of the markers, but they also capture the approximate depth of each marker. This improves the ability of the mocap system to identify markers in successive frames of capture. While a lens camera only provides useful (x, y) position information of a marker, a coded aperture camera provides (x, y, z) position information of a marker (as described above). For example, if one marker is initially in front of the other, and then in a subsequent frame the markers are separated, it is easy for the coded aperture camera to identify which marker is closer and which is further away (i.e., using the z value). This information can then be correlated with the position of the markers in a previous frame before one was obscured behind the other, which identifies which marker is which, when both markers come into view.

Additionally, it is sometimes the case that one marker is only visible by one mocap camera, and it is obscured from all other mocap cameras (e.g. by the body of the performer). With a glass lens mocap camera, it is not possible to triangulate with only one camera, and as such the markers (x, y, z) position can not be calculated. With a coded aperture camera, however, the distance to the marker is known, and as a result, its (x, y, z) position can be easily calculated.

A Coded Aperture Mask Integrated within a Display

Figure 22:
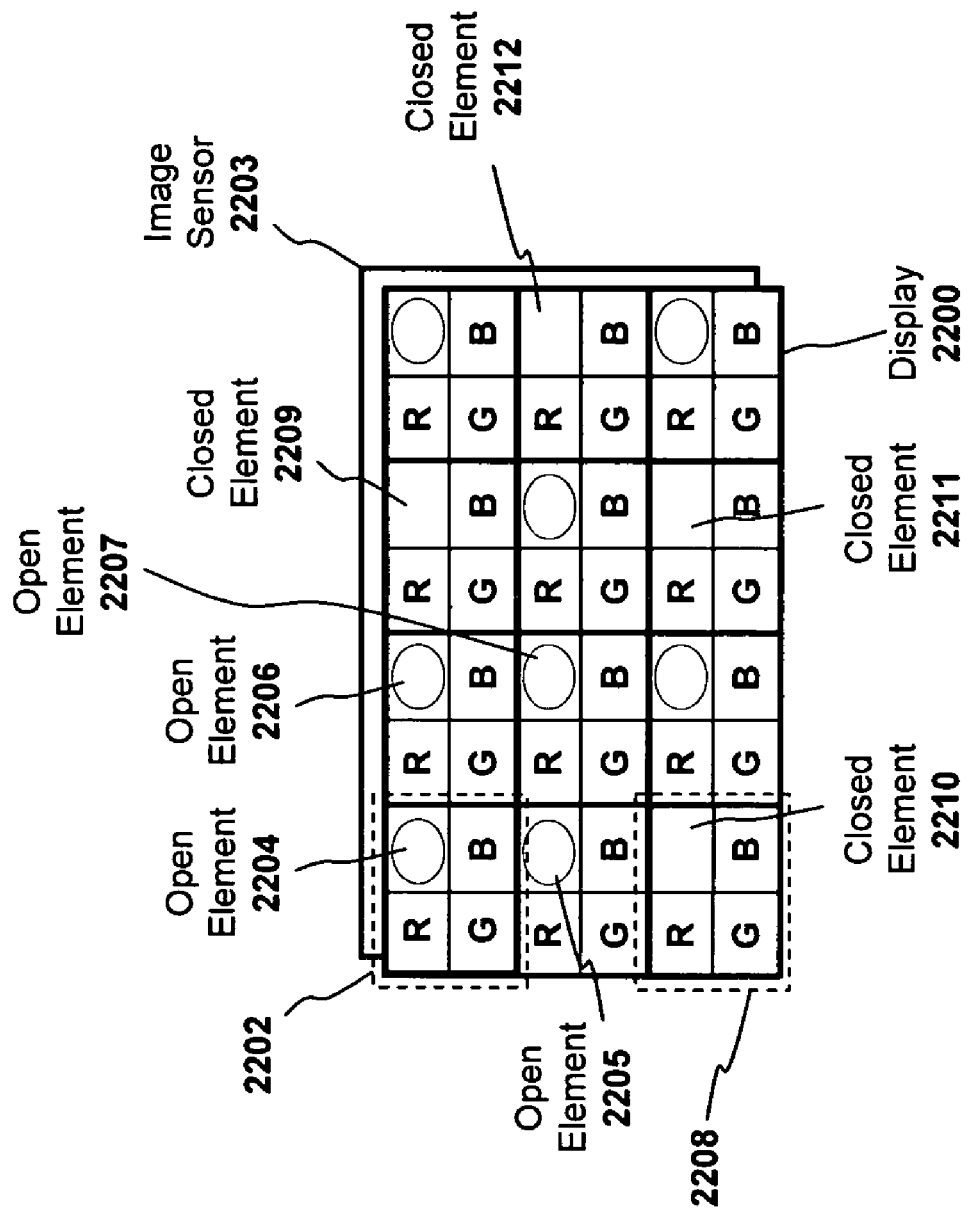
FIG. 22 illustrates a coded aperture mask integrated within a display screen in accordance with one embodiment of the invention.

In one embodiment, the coded aperture 102 described above is formed on or within a display such as an LED, OLED or LCD display. For example, as illustrated in FIG. 22, on an LED display, redundant green LEDs from what would normally be a Bayer pattern (as previously described) are removed from the display and replaced with apertures that are either open (i.e. providing a hole completely through the substrate of the LED array) or closed, and which are positioned to form a coded aperture mask pattern. In FIG. 22, open aperture element 2204 replaces the second green led from LED group 2202. The same spectrum of colors can still be generated by group 2202 by selecting relatively higher intensity levels for the remaining green LED in the group. Similarly, open aperture elements 2205-2207 are used in place of the green LEDs of their respective LED groups. In LED group 2208 a redundant green LED is removed as well, but in this case the there is no hole through the LED array, providing a closed aperture element 2210. Similarly, closed aperture elements 2209-2212 replace the second green LED from their LED groups.

The open apertures, e.g., 2204-2207, in display 2200 are used as transparent (open) elements and the closed elements, e.g. 2210-2212, in display 2200 are used as opaque (closed) elements, and in this manner, display 2200 becomes a coded aperture, functioning in the same way as the coded apertures described previously. Since the RGB elements emit light away from the open apertures 2204-2207, the only light that enters the open apertures 2204-2207 comes from the scene that is in the world in front of the LED screen. Typically, that scene will show the person or persons looking at the LED screen.

The spacing of the open and closed apertures 2205-2207 may be based on various different coded aperture patterns while still complying with the underlying principles of the invention (e.g., a MURA pattern such as that described above). Note that in a pixel group with an open element, such as 2202, only 25% of the area of the pixel group is open. In a conventional coded aperture, such as those described previous, up to 100% of the area of an open element in the coded aperture can be open to pass through light. So, the coded aperture formed by the LED display's open elements will pass through no more than 25% of the light of a non-display coded aperture such as those described above.

An image sensor 2203 is positioned behind the LED display 2200 (i.e., within the housing behind the display). Not shown is a light-opaque housing surrounding the space between the LED display 2200 and the image sensor 2204. As mentioned above, the image sensor 2203 may be a CMOS array comprised of a plurality of CMOS image sensors which capture the pattern of light transmitted through the apertures. Alternatively, in one embodiment, the image sensor is a CCD image sensor. Of course, various other image detector technologies may be employed while still complying with the underlying principles of the invention.

The image captured on image sensor 2203 is an overlapping of images from all of the open apertures, as previously described. This image is then processed and reconstructed, as previously described, frame after frame, and a video image is then output from the system. In this way, the LED display 2202 simultaneously functions as a display and a video camera, looking directly outward from the display 2202. Note that for a large display, it will not be necessary to create a coded aperture out of the entire display, nor will an image sensor the size of the entire display be necessary. Only a partial, typically centered, area of the display would be used, forming a coded aperture out of open and closed elements, with the image sensor placed behind this partial area. The rest of the display would have all closed elements.

Integrating an image capture system within a device's display solves many of the problems associated with current simultaneous display/video capture systems. For example, a user of the computing device will tend to look directly into the display (e.g., during a videoconference). Since typical prior art videoconferencing systems place the camera that captures the user above the display device, this results in a video image of the user apparently looking downward, so there is no "eye contact" between two videoconferencing individuals. Since the system described herein captures video directly looking outward from the center of the display, the user will appear to be looking directly at the person being videoconferenced with, which is more natural than in current video conferencing systems, where the apparent lack of eye contact between the parties videoconferencing is a distraction. Moreover, as previously mentioned, coded aperture imaging cameras have infinite depth of field and do not suffer from chromatic aberration, which can be cured in current systems only by using a multiple element lens—an expensive component of any camera system. As such, the coded aperture imaging techniques described herein will also significantly reduce production costs.

Using Range Information to Improve Robot Vision Systems

In another embodiment, coded aperture cameras are used in robot vision systems. For example, in manufacturing applications a conventional lens camera can not provide distance information for a robotic armature to determine the (x, y, z) position of a part that it needs to pick up and insert in an assembly, but a coded aperture camera can.

Using Increased Dynamic Range and (Distance) Range Information to Improve Security Camera Systems In one embodiment, coded aperture cameras are employed within security systems. Because they have the ability to use low dynamic range sensors to capture high dynamic range scenes, they can provide usable imagery in situations where there is backlighting that would normally wash out the image in a conventional lens camera. For example, if an intruder is entering a doorway, if there is bright daylight outside the doorway, a conventional lens camera may not be able to resolve a useful image both outside the doorway and inside the doorway, whereas a coded aperture camera can.

Embodiments of the invention may include various steps as set forth above. The steps may be embodied in machine-executable instructions which cause a general-purpose or special-purpose processor to perform certain steps. For example, the various operations described above may be software executed by a personal computer or embedded on a PCI card within a personal computer. Alternatively, or in addition, the operations may be implemented by a DSP or ASIC. Moreover, various components which are not relevant to the underlying principles of the invention such as computer memory, hard drive, input devices, etc, have been left out of the figures and description to avoid obscuring the pertinent aspects of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments of the invention are described above in the context of a "camera," the underlying principles of the invention may be implemented within virtually any type of device including, but not limited to, PDA's, cellular telephones, and notebook computers. Accordingly, the scope and spirit of the present invention should be judged in terms of the claims which follow.

What is claimed is:

1. A data processing system for capturing images comprising:
    a display for displaying graphical images and text;
    a plurality of apertures formed in the display in front of an image detector array, the plurality of apertures arranged according to a coded aperture mask pattern, wherein the coded aperture mask pattern is arranged to cause an overlapping of images projected through the apertures onto the image detector array, the coded aperture mask pattern comprising an arrangement of apertures further characterized by at least one of:
        a plurality of different aperture sizes;
        a plurality of different aperture shapes;
        a plurality of different distances between respective midpoints of neighboring apertures along a same axis of the mask pattern;
    wherein the image detector array is positioned behind the plurality of apertures to sense light within a visible spectrum transmitted through apertures in the display, the light reflected from substantially unconstrained scenery positioned in front of the display;
    the apertures having a specified, width, height and thickness to establish maximum angles at which the visible light from the unconstrained scenery can pass through the coded aperture mask pattern in a first dimension and a second dimension and reach the image detector array;
    a readout subsystem comprising an analog to digital ("A/D") converter having a specified dynamic range, the A/D converter configured to receive an analog signal from the image detector array and to responsively convert the analog signal to a digital signal, the analog signal comprising an analog representation of the overlapping images transmitted through the apertures and the digital signal comprising a digital representation of the overlapping images transmitted through the apertures,
    wherein the readout subsystem further comprises logic and/or circuitry electrically coupled to the light sensitive image detector array and the A/D converter, the logic and/or circuitry to apply zero offset and gain values to analog signals output from the light sensitive image detector array, the values of zero offset and gain selected based on the specified dynamic range of the A/D converter; and
    digital image processing logic to process the digital signal and generate a reconstructed image of the unconstrained environment by reduction of crosstalk from objects in the scene at multiple ranges.

2. The data processing system as in claim 1 wherein the display is a light emitting diode ("LED") display.

3. The data processing system as in claim 2 wherein LEDs of the display are arranged into groups of one red LED, one blue LED and two green LEDs, and wherein the apertures are formed in place of one of the two green LEDs for at least some of the groups.

4. The data processing system as in claim 1 wherein the image detector array is a Complementary Metal Oxide Semiconductor ("CMOS") array comprised of a plurality of CMOS image sensors.

5. The data processing system as in claim 4 wherein the display comprises OLED elements and wherein the OLED elements of the display are arranged into groups of one red OLED element, one blue OLED element and two green OLED elements, and wherein the apertures are formed in place of one of the two green OLED elements for at least some of the groups.

6. The data processing system as in claim 1 wherein the image detector array is comprised of a plurality of Charge Coupled Devices ("CCDs").

7. The data processing system as in claim 1 wherein the image processing logic comprises coded aperture imaging ("CAI") decoder logic.

8. The data processing system as in claim 7 wherein apertures are arranged in a Modified Uniformly Redundant Array ("MURA") pattern and wherein the CAI decoder logic comprises MURA decoder logic.

9. The data processing system as in claim 1 further comprising:
    a graphics processing unit to reproduce an image of the scenery on a display device using the reconstructed image generated by the digital image processing logic.

10. The data processing system as in claim 1 further comprising:
    a storage device to store the reconstructed image for later retrieval.

11. The data processing system as in claim 1 implemented within a portable data processing device, the portable data processing device having both wireless telephony capabilities and data processing capabilities.

12. The data processing system as in claim 1 wherein the display is an organic light emitting diode ("OLED") display having a plurality of OLED elements.

13. The data processing system as in claim 4 wherein the coded aperture mask pattern includes transmittive and non-transmittive regions along lines in both of two orthogonal dimensions.

14. The data processing system as in claim 1 wherein the specified width, height and thickness are sized to limit the field of view (FOV) to be greater than or equal to a fully-coded FOV projected onto the image detector array.

15. The data processing system as in claim 1 wherein the digital image processing logic adjusts intensity at different regions of the reconstructed image by multiplying each pixel of the reconstructed image by an inverse of a baffle attenuation value the pixel was subjected to.

16. The data processing system as in claim 1 further comprising:
a noise-reducing smoothing filter having a filter characteristic adjusted for each pixel or each region of the reconstructed image according to signal-to-noise ratio variations within the reconstructed image.

17. The data processing system as in claim 1 wherein the light-sensitive image detector array comprises a color filter array ("CFA") for capturing color images.

18. The data processing system as in claim 1 wherein to generate the reconstructed image, the digital image processing logic performs the additional operation of calculating a periodic cross-correlation function of the digital signal received from the A/D converter with a periodic inverse filter.

19. A data processing system for capturing images comprising:
a display for displaying graphical images and text;
a plurality of apertures formed in the display in front of an image detector array, the plurality of apertures arranged according to a coded aperture mask pattern, wherein the coded aperture mask pattern is arranged to cause an overlapping of images projected through the apertures onto the image detector array, the coded aperture mask pattern comprising an arrangement of apertures further characterized by at least one of:
a plurality of different aperture sizes;
a plurality of different aperture shapes;
a plurality of different distances between respective midpoints of neighboring apertures along a same axis of the mask pattern;
wherein the image detector array is positioned behind the plurality of apertures to sense light within a visible spectrum transmitted through apertures in the display, the light reflected from substantially unconstrained scenery positioned in front of the display;
the apertures having a specified, width, height and thickness to limit a field of view (FOV) of the unconstrained environment to be equal to or greater than a fully-coded FOV projected onto the image detector array;
a readout subsystem comprising an analog to digital ("A/D") converter having a specified dynamic range, the A/D converter configured to receive an analog signal from the image detector array and to responsively convert the analog signal to a digital signal, the analog signal comprising an analog representation of the overlapping images transmitted through the apertures and the digital signal comprising a digital representation of the overlapping images transmitted through the apertures
wherein the readout subsystem further comprises logic and/or circuitry electrically coupled to the light sensitive image detector array and the A/D converter, the logic and/or circuitry to apply zero offset and gain values to analog signals output from the light sensitive image detector array, the values of zero offset and gain selected based on the specified dynamic range of the A/D converter; and
digital image processing logic to process the digital signal and generate a reconstructed image of the unconstrained environment, by reduction of crosstalk from objects in the scene at multiple ranges.

20. The data processing system as in claim 19 wherein the digital image processing logic adjusts intensity at different regions of the reconstructed image by multiplying each pixel of the reconstructed image by an inverse of a baffle attenuation value the pixel was subjected to.

21. The data processing system as in claim 19 wherein the display is a light emitting diode ("LED") display.

22. The data processing system as in claim 21 wherein LEDs of the display are arranged into groups of one red LED, one blue LED and two green LEDs, and wherein the apertures are formed in place of one of the two green LEDs for at least some of the groups.

23. The data processing system as in claim 19 wherein the image detector array is a Complementary Metal Oxide Semiconductor ("CMOS") array comprised of a plurality of CMOS image sensors.

24. The data processing system as in claim 19 wherein the image detector array is comprised of a plurality of Charge Coupled Devices ("CCDs").

25. The data processing system as in claim 19 wherein the image processing logic comprises coded aperture imaging ("CAI") decoder logic.

26. The data processing system as in claim 25 wherein the apertures are arranged in a Modified Uniformly Redundant Array ("MURA") pattern and wherein the CAI decoder logic comprises MURA decoder logic.

27. The data processing system as in claim 19 further comprising:
a graphics processing unit to reproduce an image of the scenery on a display device using the reconstructed image generated by the digital image processing logic.

28. The data processing system as in claim 19 further comprising:
a storage device to store the reconstructed image for later retrieval.

29. The data processing system as in claim 19 implemented within a portable data processing device, the portable data processing device having both wireless telephony capabilities and data processing capabilities.

30. The data processing system as in claim 19 further comprising:
a noise-reducing smoothing filter having a filter characteristic adjusted for each pixel or each region of the reconstructed image according to signal-to-noise ratio variations within the reconstructed image.

31. The data processing system as in claim 19 wherein the image detector array comprises a color filter array ("CFA") for capturing color images.

32. The data processing system as in claim 19 wherein to generate the reconstructed image, the digital image processing logic performs the additional operation of calculating a periodic cross-correlation function of the digital signal received from the A/D converter with a periodic inverse filter.

* * * * *